US011280057B2

(12) United States Patent
Seifert

(10) Patent No.: US 11,280,057 B2
(45) Date of Patent: Mar. 22, 2022

(54) SYSTEM AND METHOD FOR ATTACHING IMPLEMENTS TO DIFFERENT SKID STEER MOUNTS

(71) Applicant: Premier Hydraulic Augers, Inc., Fort Wayne, IN (US)

(72) Inventor: Gregory L Seifert, Columbia City, IN (US)

(73) Assignee: Premier Hydraulic Augers, Inc., Fort Wayne, IN (US)

( * ) Notice: Subject to any disclaimer, the term of this patent is extended or adjusted under 35 U.S.C. 154(b) by 250 days.

(21) Appl. No.: 16/778,417

(22) Filed: Jan. 31, 2020

(65) Prior Publication Data

US 2021/0238823 A1 Aug. 5, 2021

(51) Int. Cl.
*E02F 3/36* (2006.01)
*A01D 67/00* (2006.01)

(52) U.S. Cl.
CPC .......... *E02F 3/3609* (2013.01); *A01D 67/005* (2013.01)

(58) Field of Classification Search
CPC .... A01D 67/005; E02F 3/3414; E02F 3/3604; E02F 3/3609; E02F 3/364; E02F 3/3659; E02F 3/3663; E02F 3/3668; E02F 3/3672
See application file for complete search history.

(56) References Cited

U.S. PATENT DOCUMENTS 4,545,720 A * 10/1985 Cochran ............... E02F 3/3627
172/275
5,098,252 A * 3/1992 Sheesley ............... E02F 3/3627
172/273
5,403,144 A 4/1995 Staben, Jr.
5,685,689 A 11/1997 Schneider et al.
6,238,130 B1 5/2001 Youngers
6,360,459 B1 3/2002 Brookhart et al.
6,499,934 B1 12/2002 Kaczmarski et al.
6,851,916 B2 2/2005 Schmidt
(Continued)

OTHER PUBLICATIONS

International Search Report in related PCT/US21/15099.
Written Opinion of the International Search Authority in related PCT/US21/15099.

*Primary Examiner* — Saul Rodriguez
*Assistant Examiner* — Brendan P Tighe
(74) *Attorney, Agent, or Firm* — George Pappas; Barrett McNagny LLP

(57) ABSTRACT

A system and method for attaching implements to skid steer machines having different implement mounting configurations. The implements include or are separately provided with a securement frame defining a mini skid steer pocket engageable with a mini skid steer mount and a larger standard skid steer pocket engageable with a standard skid steer mount. The mini pocket is located between the implement and the standard pocket. A passage opening extends through the standard pocket where through the mini pocket is accessible. For attaching the implement to a mini skid steer, the mini skid steer mount is inserted through the passage opening and engages the mini skid steer pocket while the standard skid steer pocket remains unused. For attaching the implement to a standard skid steer, the standard skid steer mount is inserted directly into and engages the standard skid steer pocket while the mini skid steer pocket remains unused.

23 Claims, 29 Drawing Sheets

(56) References Cited

U.S. PATENT DOCUMENTS

| | | | |
|---|---|---|---|
| 7,073,972 B1 * | 7/2006 | Schumacher | E02F 3/3627 |
| | | | 403/382 |
| 7,415,748 B1 | 8/2008 | Guhr et al. | |
| 7,455,494 B2 | 11/2008 | Krieger | |
| 7,513,732 B1 | 4/2009 | Callens | |
| 7,524,158 B2 | 4/2009 | Eckstein et al. | |
| 7,828,270 B2 | 11/2010 | Duvall | |
| 8,763,226 B1 * | 7/2014 | Gustafson | E02F 3/365 |
| | | | 29/281.1 |
| 10,480,152 B1 | 11/2019 | Smith | |
| 2004/0067126 A1 * | 4/2004 | Schmidt | E02F 3/3604 |
| | | | 414/723 |
| 2006/0120848 A1 | 6/2006 | Guhr | |
| 2014/0317967 A1 * | 10/2014 | Parker | E02F 3/3627 |
| | | | 37/403 |
| 2019/0257057 A1 | 8/2019 | Eckrote | |

* cited by examiner

SYSTEM AND METHOD FOR ATTACHING IMPLEMENTS TO DIFFERENT SKID STEER MOUNTS

BACKGROUND OF THE INVENTION

1. Field of the Invention

The present invention relates generally to the field of implements such as augers, fork lifts, mowers and trenchers which are selectively attachable to skid steer machines. More particularly, the present invention relates to securement structures for selectively attaching such implements to different skid steer implement mounts such as mini steer skid mounts and standard steer skid mounts.

2. Background

Implements such as hydraulic augers, fork lifts, hydraulic mowers, hydraulic trenchers, etc., are commonly used by attaching to skid steer machines such as mini skid steers and standard skid steers. The skid steer machines are typically engine powered and are supported and driven with tracks or wheels. The implements are attached to skid steer mounts/structures which are typically directly attached to the skid steer machines and/or are attached to selectively movable loader arms. The skid steer machines provide mobility and the ability to lift and locate the implements as may be needed or desired for utilizing the implements. The skid steer machines often also provide hydraulic power and/or electric power for driving implements which are not self-powered.

Different manufacturers of skid steer machines have, however, equipped their skid steer machines with various different types and sizes of implement mounts. For example, two different commonly used skid steer implement mounts are known to those skilled in the art as "mini skid steer mounts" or "mini skid steer plates" and "standard skid steer mounts" or "standard skid steer plates". The mini skid steer mounts/plates are not compatible with standard skid steer mounts/plates, and so implements which are adapted to be attached to mini skid steer mounts/plates cannot be attached to standard skid steer mounts/plates, and vice versa. As can be appreciated, therefore, it would be efficient and would minimize costs if any one implement, e.g. an auger, forklift, mower etc., can be interchangeable and attachable with, for example, both mini skid steer mounts/plates and standard skid steer mounts/plates.

Adapters for allowing standard sized skid steer implements to be mounted on mini skid steer machines and, alternatively, for allowing mini sized skid steer implements to be mounted on standard skid steer machines have been devised as, for example, shown and described in Gurh, US 2006/0120848 and Sheesley et al., U.S. Pat. No. 5,098,252. These adapters can generally be described as female-male adapters. That is, for adapting a mini sized skid steer implement to be mounted on standard skid steer machine, the adaptor comprises, on one side thereof, a pocket adapted to receive a standard skid steer mount and, on the other side thereof, comprises a mini skid steer mount/plate as would normally be provided on a mini skid steer machine. Similarly, for adapting a standard sized skid steer implement to be mounted on mini skid steer machine, the adaptor comprises, on one side thereof, a pocket adapted to receive a mini skid steer mount and, on the other side thereof, comprises a standard skid steer mount/plate as would normally be provided on a standard skid steer machine. As can be appreciated, however, this system requires maintaining adapters in stock, separate from the implements, and further requires a separate adaptor for each skid steer machine e.g., a standard skid steer to mini skid steer adaptor for attaching a mini skid steer implement to a standard skid steer mount, and a mini skid steer to standard skid steer adaptor for attaching a standard skid steer implement to a mini skid steer mount.

Accordingly, a need exists for an improved system and method for attaching implements to different skid steer mounts which overcomes the disadvantages of prior adapters and provides an efficient and expedient means for selectively attaching implements to various different skid steer machine mounts such as mini skid steer implement mounts and standard skid steer implement mounts.

SUMMARY OF THE INVENTION

The present invention overcomes the disadvantageous of prior implement adapters and implement attachment systems and provides an efficient and expedient means for selectively attaching implements to various different skid steer machine mounts such as mini skid steer implement mounts and standard skid steer implement mounts. In one form thereof, the present invention is directed to an implement selectively attachable to a first skid steer implements mount and to a second skid steer implements mount. The implement includes a first skid steer pocket secured to the implement, wherein the first skid steer pocket is engageable with the first skid steer implements mount, and a second skid steer pocket secured to the implement, wherein the second skid steer pocket is engageable with the second skid steer implements mount. The second skid steer pocket is located between the implement and the first skid steer pocket. A passage opening extending through the first skid steer pocket wherethrough the second skid steer pocket is accessible. For attaching the implement to the second skid steer implements mount, the second skid steer implements mount is inserted through the passage opening and engages the second skid steer pocket and, for attaching the implement to the first skid steer implements mount, the first skid steer implements mount engages the first skid steer pocket.

Preferably, the first skid steer implements mount includes a standard skid steer mounting plate; the second skid steer implements mount includes a mini skid steer mounting plate; the mini skid steer mounting plate is smaller than the standard steer skid mounting plate; and, the mini skid steer mounting plate is insertable through the passage opening and into the second skid steer pocket. The first skid steer pocket can extend generally along a first plane and the second skid steer pocket can extend generally along a second plane, the first and second planes can be parallel to one another or can be at an angle with respect to one another/not parallel to each other.

The first skid steer implements mount can include an upper end and the first skid steer pocket can include a saddle adapted to receive the upper end of the first skid steer implements mount. The second skid steer implements mount can include an upper end and the second skid steer pocket can include a saddle adapted to receive the upper end of the second skid steer mount; the second skid steer mount can be adapted to engage the second skid steer pocket by inserting its upper end into the second skid steer saddle; and, the first mount can be adapted to engage the first skid steer pocket by inserting its upper end into the first skid steer saddle. Preferably, when the second skid steer mount engages the second skid steer pocket its lower end is latched to a lower end of the second skid steer pocket; and, when the first mount engages the first skid steer pocket its lower end is latched to a lower end of the first skid steer pocket.

The first skid steer implements mount can further include a first mounting plate having upper and lower ends, and the first skid steer pocket can include a saddle adapted to receive the upper end of the first mounting plate. The second skid steer implements mount can further include a second mounting plate having upper and lower ends, and the second skid steer pocket can include a saddle adapted to receive the upper end of the second mounting plate. The second mounting plate can be smaller than the first mounting plate, and the second mounting plate can also be smaller than the passage opening whereby the second mounting plate is insertable through the passage opening, and the second mounting plate engages the second skid steer pocket by inserting its upper end into the second skid steer saddle and latching its lower end to a lower end of the second skid steer pocket; and, the first mounting plate engages the first skid steer pocket by inserting its upper end into the first skid steer saddle and latching its lower end to a lower end of the first skid steer pocket.

In one embodiment, the second skid steer implement mount is smaller than the first skid steer implement mount, the first skid steer pocket is not engageable with the second skid steer implements mount; and, the second skid steer pocket is not engageable with the first skid steer implements mount.

In another form thereof, the present invention is directed to a securement frame cooperative with an implement for selectively attaching a first skid steer implements mount and a second skid steer implements mount to the implement, the implement securement frame includes a first skid steer pocket engageable with the first skid steer implements mount and a second skid steer pocket engageable with the second skid steer implements mount. The second skid steer pocket is located between the implement and the first skid steer pocket. A passage opening extends through the first skid steer pocket wherethrough the second skid steer pocket is accessible. For attaching the implement to the second skid steer implements mount, the second skid steer implements mount is inserted through the passage opening and engages the second skid steer pocket and, for attaching the implement to the first skid steer implements mount, the first skid steer implements mount engages the first skid steer pocket. The securement frame can include the further improvements and embodiments as described herein above with respect to the implement.

In yet another form thereof, the present invention is directed to a method of selectively attaching a first skid steer implements mount and a second skid steer implements mount to an implement. The implement includes a frame comprising: a first skid steer pocket engageable with the first skid steer implements mount and not engageable with the second skid steer implements mount; a second skid steer pocket engageable with the second skid steer implements mount and not engageable with the first skid steer implements mount; wherein the second skid steer pocket is located between the implement and the first skid steer pocket; and, a passage opening extending through the first skid steer pocket wherethrough the second skid steer pocket is accessible. The method includes the steps of: for attaching the second skid steer implements mount to the implement, inserting the second skid steer implements mount through the passage opening and engaging the second skid steer implements mount with the second skid steer pocket; and, for attaching the first skid steer implements mount to the implement, engaging the first skid steer implements mount with the first skid steer pocket.

The implement can include the further improvements and embodiments as described herein above with respect to the implement so that:

during the step of inserting, the mini skid steer mounting plate is inserted through the passage opening and into the second skid steer pocket; and/or, during the step of engaging the second skid steer implements mount with the second skid steer pocket, the implement is engaged at an angle which is substantially the same relative to during the step of engaging the first skid steer implements mount with the first skid steer pocket; and/or, during the step of engaging the second skid steer implements mount with the second skid steer pocket, the implement is engaged at an angle which is different relative to during the step of engaging the first skid steer implements mount with the first skid steer pocket; and/or, during the step of engaging the second skid steer implements mount, the second skid steer mount engages the second skid steer pocket by inserting its upper end into the second skid steer saddle; and, during the step of engaging the first skid steer implements mount, the first skid steer mount engages the first skid steer pocket by inserting its upper end into the first skid steer saddle; and/or, during the step of engaging the second skid steer implements mount, the second skid steer mount engages the second skid steer pocket by inserting its upper end into the second skid steer saddle and latching its lower end to a lower end of the second skid steer pocket; and, during the step of engaging the first skid steer implements mount, the first skid steer mount engages the first skid steer pocket by inserting its upper end into the first skid steer saddle and latching its lower end to a lower end of the first skid steer pocket; and/or, during the step of inserting, the second mounting plate is inserted through the passage opening and, during the step of engaging the second skid steer implements mount, the second mounting plate engages the second skid steer pocket by inserting its upper end into the second skid steer saddle and latching its lower end to a lower end of the second skid steer pocket; and, during the step of engaging the first skid steer implements mount, the first mounting plate engages the first skid steer pocket by inserting its upper end into the first skid steer saddle and latching its lower end to a lower end of the first skid steer pocket.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Figure 1:
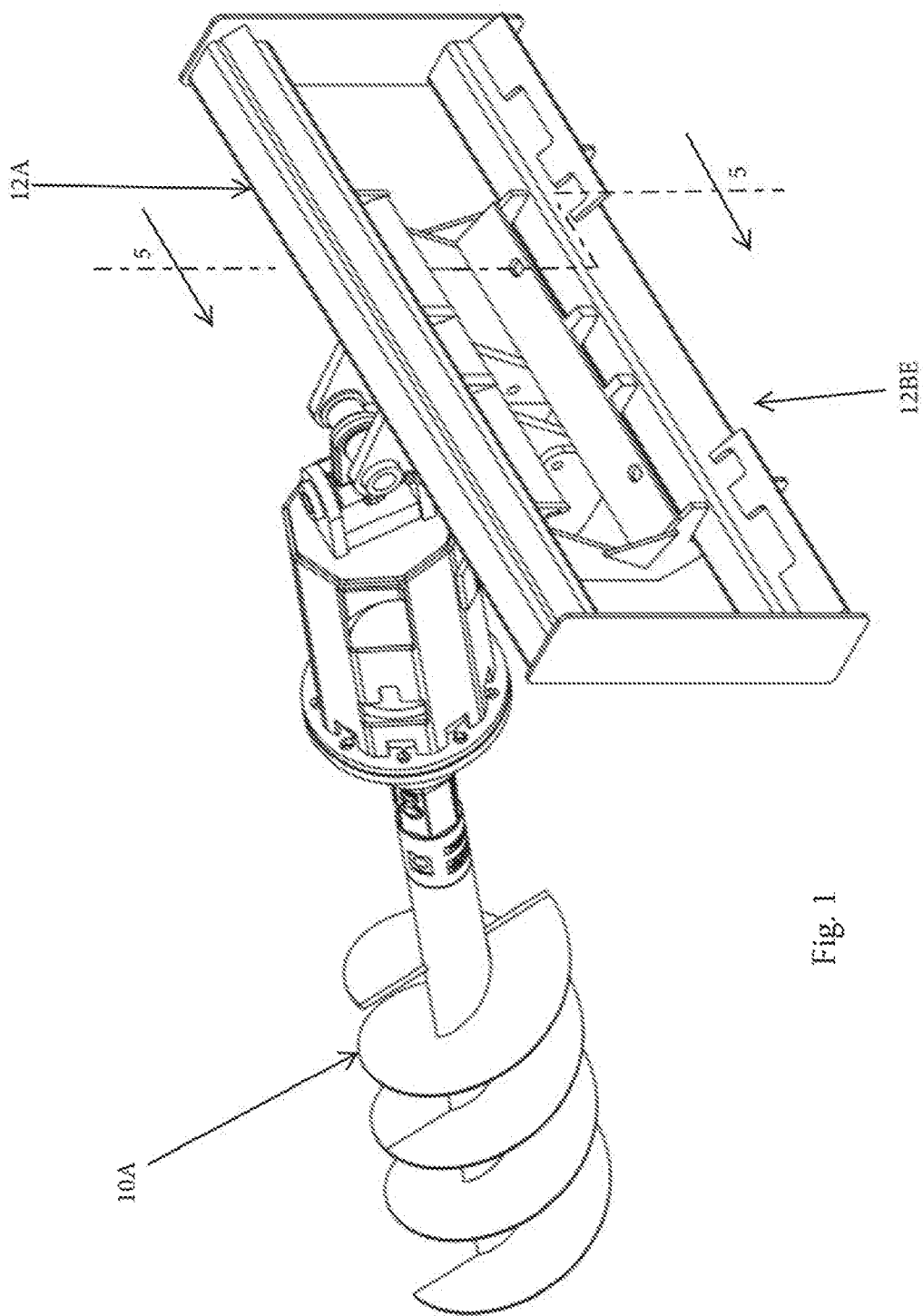
FIG. 1 is a perspective view of a hydraulic auger implement and securement frame constructed in accordance with the principles of the present invention for selectively attaching to different skid steer implement mounts such as mini steer skid mounts and standard steer skid mounts.
Figure 2:
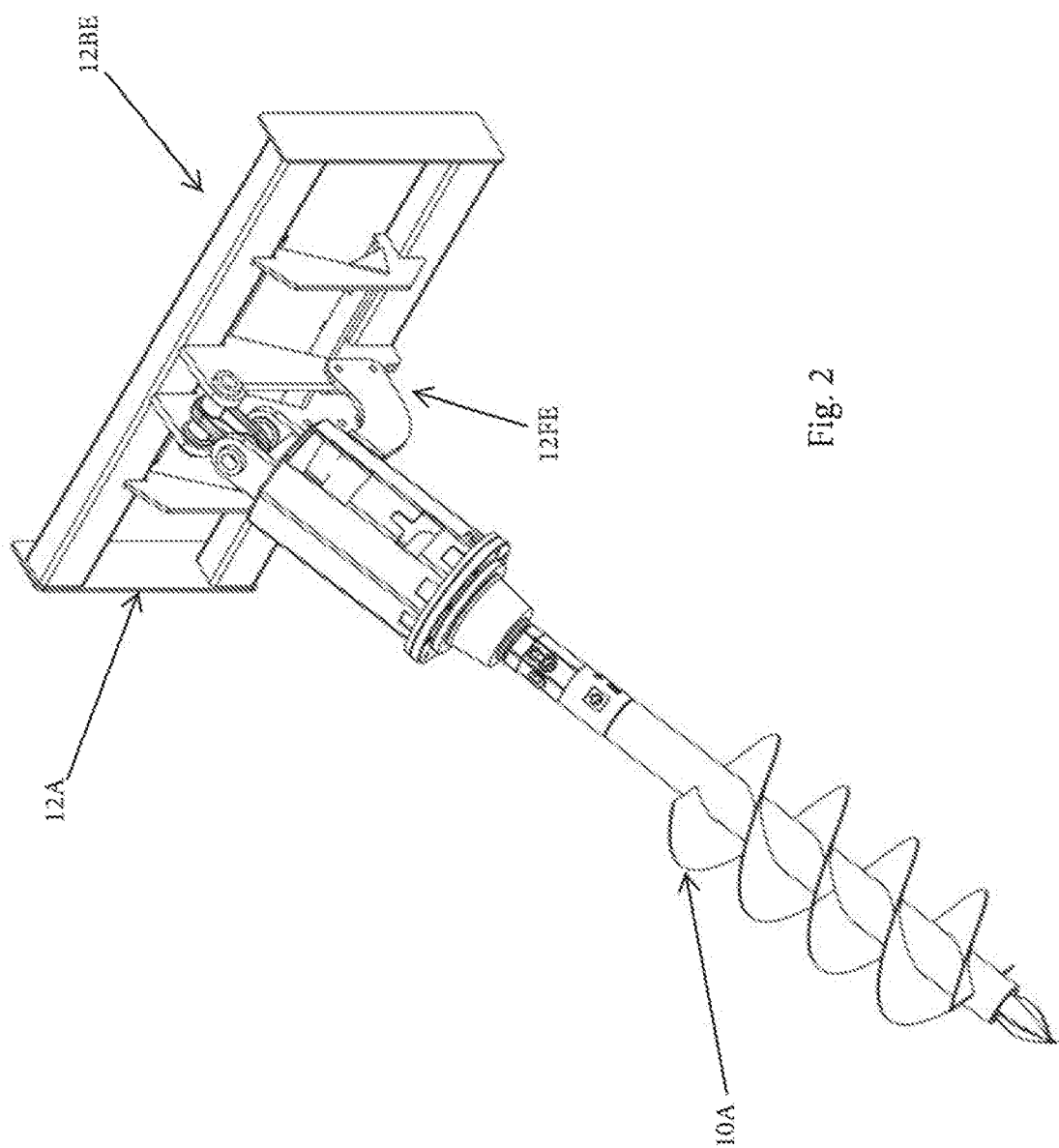
FIG. 2 is another perspective view of the hydraulic auger and securement frame shown in FIG. 1.
Figure 3:
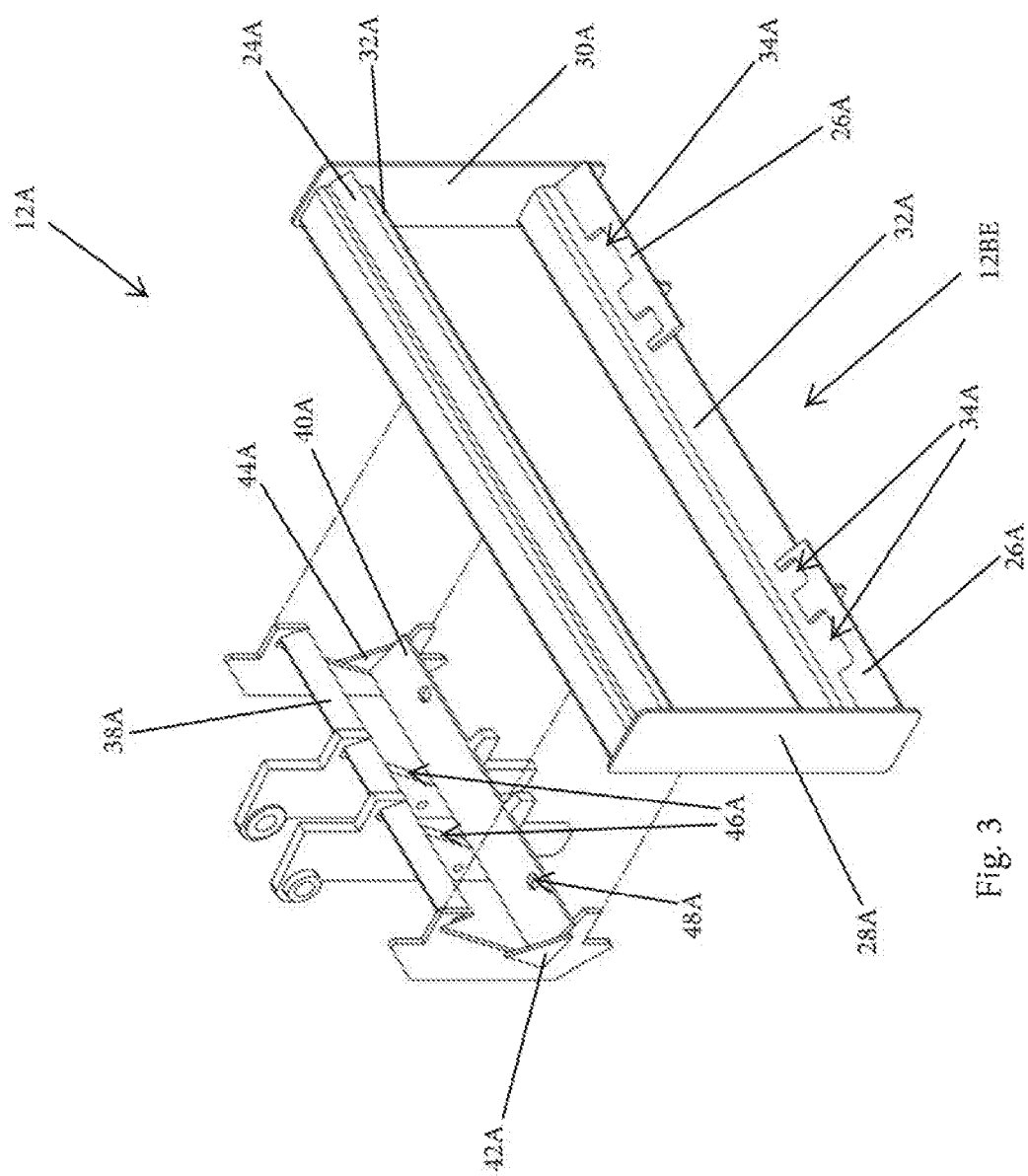
FIG. 3 is an exploded perspective view of the securement frame shown in FIG. 1, as seen from the back end.
Figure 4:
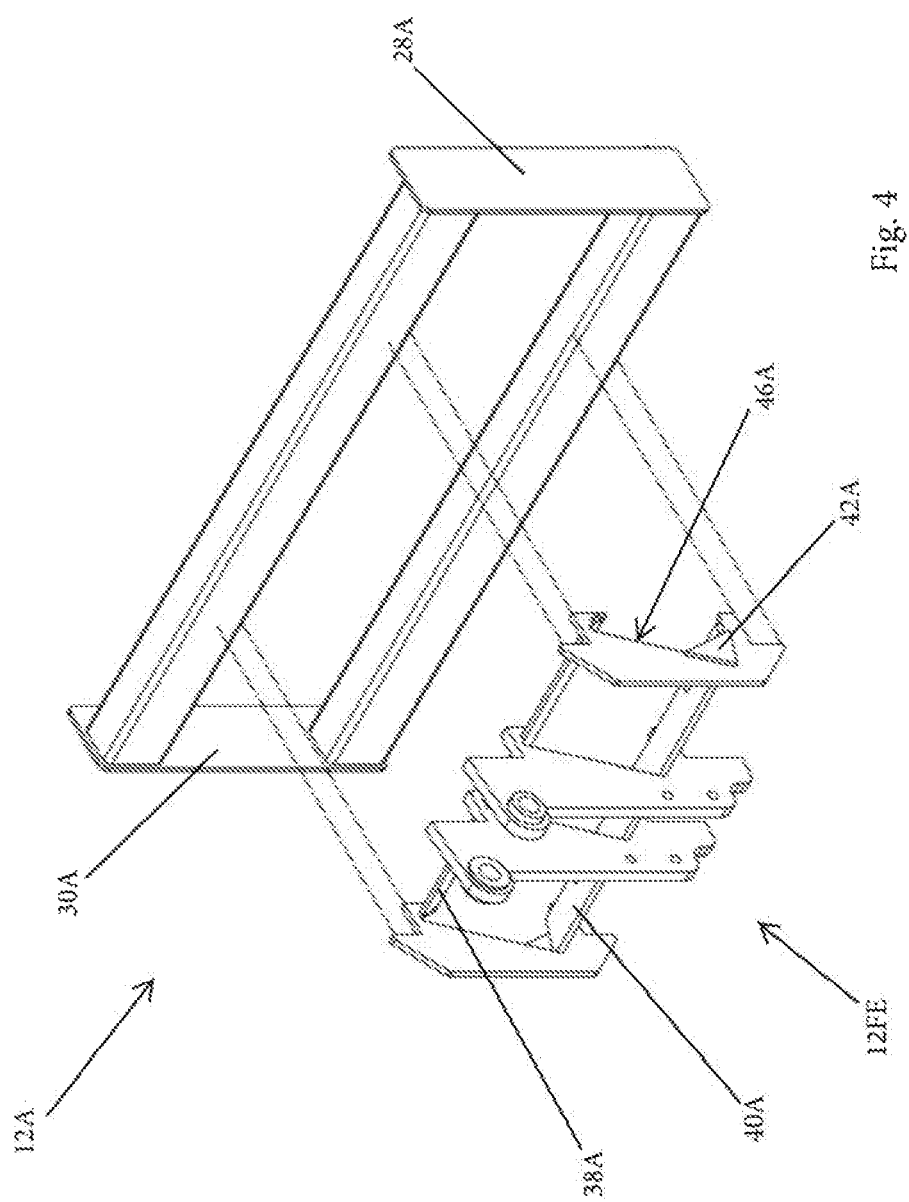
FIG. 4 is an exploded perspective view of the securement frame shown in FIG. 3, as seen from the front end.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

A system and method for attaching implements to different skid steer mounts in accordance with the principles of the present invention is shown in the several drawings wherein various implements are generally designated by the numeral 10 and exemplary types of implements are shown and can, for example, include a hydraulically powered auger 10A, lifting forks 10F, a hydraulically powered mower 10M, a hydraulically powered trencher 10T, etc. A securement frame generally designated by the numeral 12 is provided and includes means as described herein below for cooperatively selectively attaching the implements 10 to various different skid steer implement mounts 14 such as, for example, mini skid steer implement mounts 14M and standard skid steer implement mounts 14S which are commonly known to those skilled in the art. The securement frame 12 can be provided as a component of the implements 10 or separately therefrom as an adaptor between the implements 10 and the skid steer implement mounts 14 whereby, for example, any one of the auger 10A, lifting forks 10F, mower 10M, trencher 10T, etc., can selectively be attached to any one of the mini skid steer mounts 14M, standard skid steer mounts 14S, etc. When the securement frame 12 is provided as a component of the implements 10, rather than as an adaptor, the securement frame 12 can take on various shapes and forms as may be needed or desired for use with the specific implement of which it is a component such as, for example, a securement frame 12A for the auger 10A, a securement frame 12F for lifting forks 10F, a securement frame 12M for mower 10M, a securement frame 12T for trencher 10T, etc.

As mentioned herein above, exemplary skid steer implement mounts 14 can include mini skid steer mounts 14M and standard skid steer mounts 14S. The skid steer implement mounts 14 are carried by or otherwise secured to skid steer machinery diagrammatically partially shown in the drawings and generally designated by the numeral 16. Skid steer machinery 16 are well known to those skilled in the art and are typically engine powered machines supported and driven with tracks 16T or wheels (not shown). The skid steer implement mounts 14 can be directly secured to the skid steer machine 16 or, for example, can be secured to movable arms 16A, such as loader arms, whereby the skid steer implement mounts 14 and any implement 10 attached thereto can be selectively lifted, lowered and otherwise moved as may be needed or desired.

The exemplary mini skid steer mounts 14M and standard skid steer mounts 14S can include one or more mounting plates, as is known to those skilled in the art, and which are diagrammatically depicted in the drawings in side view and designated by the numerals 14MP and 14SP. As is also known to those skilled in the art, the effective height and width of the mini skid steer mounting plate(s) 14MP is smaller than the effective height and width of the standard skid steer mounting plate(s) 14SP.

The mini skid steer mount 14M and/or its mounting plate(s) 14MP define an upper end or edge 14MU and a lower end or edge 14ML. An engagement/latching mechanism such as one or more spring-loaded pins 14ME is provided at the lower end 14ML for engaging with and latching/securing the lower end 14ML of the mini skid steer mount 14M to a securement frame 12 as further described herein below. Alternatively, the securement frame 12 can be provided with an engagement/latching mechanism such as one or more spring-loaded pins (not shown) for engaging with and latching/securing the lower end 14ML of the mini skid steer mount 14M to the securement frame 12.

Similarly, the standard skid steer mount 14S and/or its mounting plate(s) 14SP define an upper end or edge 14SU and a lower end or edge 14SL. An engagement/latching mechanism such as one or more spring-loaded pins 14SE is provided at the lower end 14SL for engaging with and latching/securing the lower end 14SL of the standard skid steer mount 14S to a securement frame 12 as further described herein below. Alternatively, the securement frame 12 can be provided with an engagement/latching mechanism such as one or more spring-loaded pins (not shown) for engaging with and latching/securing the lower end 14SL of the standard skid steer mount 14S to the securement frame 12.

As those skilled in the art will appreciate, the securement frame 12 can be constructed of metal, aluminum or other steel plate material which has been cut, shaped, assembled and welded or otherwise secured together as shown and depicted in the drawings for thereby forming a desired shape and form, achieving a desired strength, etc., for securely attaching the implements 10 to the skid steer implement mounts 14. The securement frame 12, in general, is defined between a frame steer skid mount attachment/back end 12BE whereat or through the steer skid implement mounts 14 are received and secured, and a frame implements/front end 12FE whereat the implements 10 are located and/or secured. Additionally, in accordance with the principles of the present invention, securement frame 12 is constructed so as to define a standard skid steer pocket generally designated by the numeral 18 and a mini skid steer pocket generally designated by the numeral 20.

As further described herein below and shown in the drawings, the standard steer skid implements mount 14S is engageable with the standard skid steer pocket 18 and is not directly engageable with the mini skid steer pocket 20. The mini steer skid implements mount 14M is engageable with the mini steer skid pocket 20 and is not directly engageable with the standard skid steer pocket 18. Additionally, the mini skid steer pocket 20 is located between the standard skid steer pocket 18 and the implement 10, and a passage opening generally designated by the numeral 22 is provided extending through the standard skid steer pocket 18 and leading to the mini steer skid pocket 20. The passage opening 22 is sized to receive a mini steer skid implements mount 14M therethrough. That is, the effective height and width of the passage opening 22 is smaller than the effective height and width of the standard skid steer pocket 18 but is sufficiently large enough for a mini steer skid implements mount 14M to be inserted therethrough and into the mini skid steer pockets 24.

Advantageously, for attaching the implement 10 to a mini steer skid mount 14M, the mini steer skid mount 14M is inserted from the securement frame back end 12BE through the passage opening 22 and into the mini skid steer pocket 20 whereat it is engaged therewith. The standard skid steer pocket 18 is, therefore, effectively not used when engaging a mini steer skid mount 14M with the mini skid steer pocket 20.

For attaching the implement 10 to a standard steer skid mount 14S, the standard steer skid mount 14S is inserted from the securement frame back end 12BE and into the standard skid steer pocket 18 whereat it is engaged therewith. The mini steer skid pocket 20 is, therefore, effectively not used when engaging a standard steer skid mount 14S with the standard steer skid pocket 18.

As those skilled in the art will also appreciate, the securement frame 12 can be constructed in a variety of ways, and as generally described hereinabove, so as to define the standard skid steer pocket 18 and the mini skid steer pocket 20. In this regard, four exemplary embodiments thereof are shown in the drawings and further described herein below wherein: in FIGS. 1-7, the standard skid steer pocket 18A, the mini skid steer pocket 20A and passage opening 22A are incorporated and are defined in the securement frame 12A for the auger 10A; in FIGS. 8-15, the standard skid steer pocket 18F, the mini skid steer pocket 20F and passage opening 22F are incorporated and are defined in the securement frame 12F for the lifting forks 10F; in FIGS. 16-22, the standard skid steer pocket 18M, the mini skid steer pocket 20M and passage opening 22M are incorporated and are defined in the securement frame 12M for the mower 10M; and, in FIGS. 23-29, the standard skid steer pocket 18T, the mini skid steer pocket 20T and passage opening 22T are incorporated and are defined in the securement frame 12T for the trencher 10T.

Referring now more particularly to FIGS. 1-7, the standard skid steer pocket 18A is shown and defined between upper plate(s) 24A, lower plate(s) 26A, left side plate or surface 28A, right side plate or surface 30A and back wall surface(s) 32A. Of course, an opening is provided (not numbered) from the back end 12BE of the securement frame 12A into the standard steer skid pocket 18A wherethrough a standard skid steer implement mount 14S can be inserted into the standard steer skid pocket 18A for engagement therewith. The lower plate(s) 26A are provided with latch pin receiving hole(s) 34A adapted to receive/engage with the engagement/latching mechanism or spring-loaded pins 14SE of the standard skid steer implements mount 14S and latch the lower end 14SL thereof to the lower plate(s) 26A or lower end of the standard skid steer pocket 18A.

Figure 5:
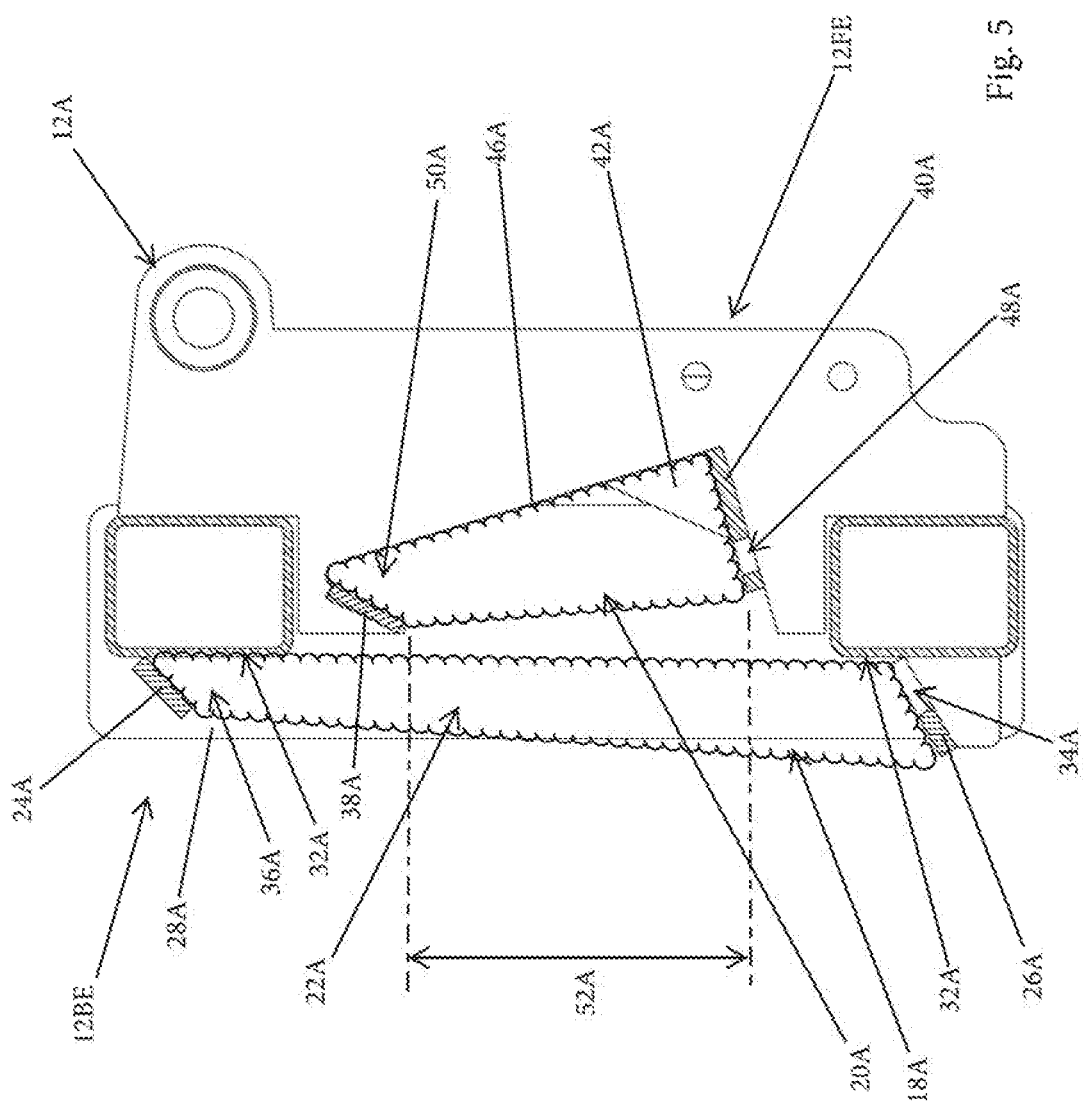
FIG. 5 is a cross section view of the securement frame shown in FIG. 1 taken along line 5-5.

As best seen in FIG. 5 wherein the standard skid steer pocket 18A is diagrammatically depicted in cross section with cloud lines, a saddle 36A is formed between the upper plate(s) 24A and the back wall surface(s) 32A between the left side plate or surface 28A and the right side plate or surface 30A. The saddle 36A is sized and adapted to receive the upper end 14SU of the standard skid steer implement mounts 14S.

The mini skid steer pocket 20A is shown and defined between upper plate(s) 38A, lower plate(s) 40A, left side plate or surface 42A, right side plate or surface 44A and back wall surface(s) 46A. The lower plate(s) 40A are provided with latch pin receiving hole(s) 48A which are adapted to receive/engage with the engagement/latching mechanism or spring-loaded pins 14ME of the mini skid steer implements mount 14M and latch the lower end 14ML thereof to the lower plate(s) 40A or lower end of the mini skid steer pocket 20A.

As best seen in FIG. 5 wherein the mini skid steer pocket 20A is also diagrammatically depicted in cross section with cloud lines, a saddle 50A is formed between the upper plate(s) 38A and the back wall surface(s) 46A between the left side plate or surface 42A and the right side plate or surface 44A. The saddle 50A is sized and adapted to receive the upper end 14MU of the mini skid steer implement mounts 14M.

Figure 6:
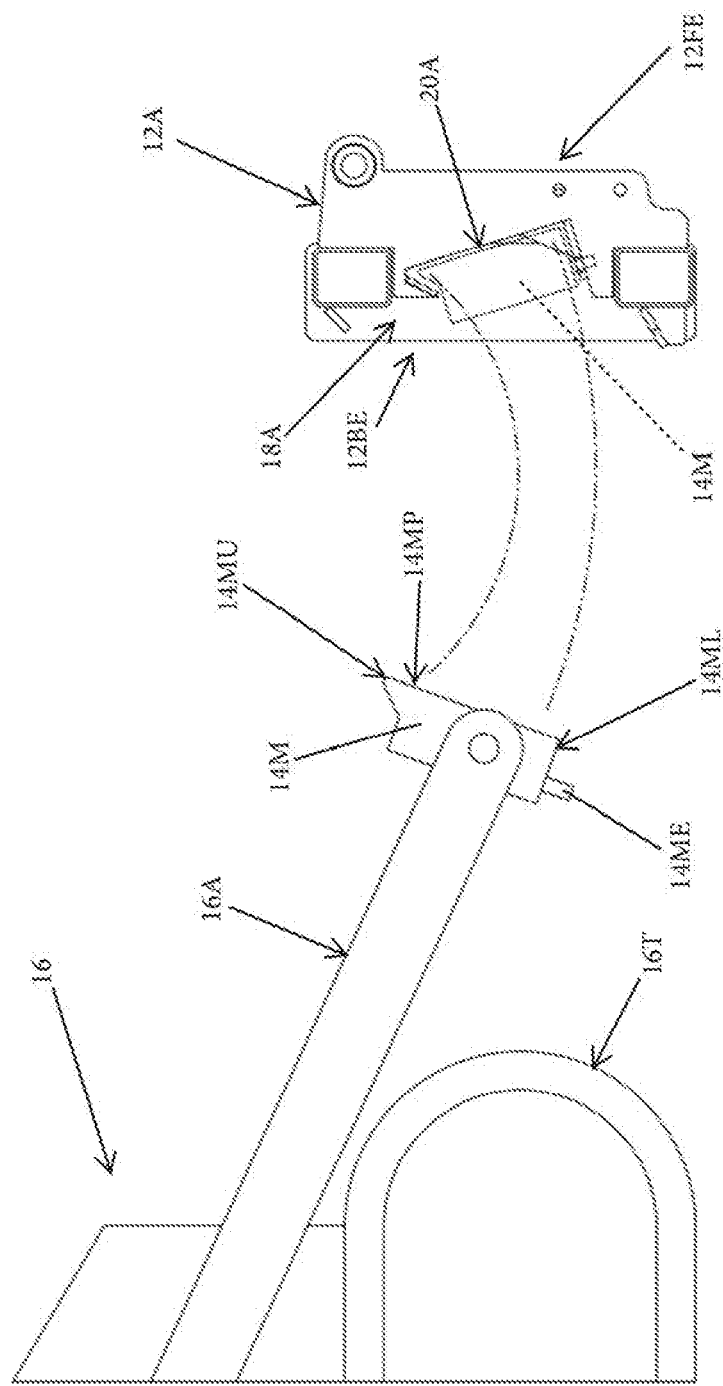
FIG. 6 is a cross section view of the securement frame as shown in FIG. 5 and a diagrammatic skid steer machine depicting the method of selectively attaching a mini steer skid mount to the hydraulic auger and securement frame shown in FIG. 1.

A mini skid steer pocket opening generally designated by the numeral/arrow 52A is defined generally between the upper plate(s) 38A, lower plate(s) 40A, left side plate or surface 42A and right side plate or surface 44A and communicates with the passage opening 22A extending through the standard steer skid pocket 18A. Accordingly, as depicted in FIG. 6, for attaching the auger implement 10A to the mini skid steer implements mount 14M, the mini skid steer implements mount 14M is inserted from the back end 12BE of the securement frame 12A through the passage opening 22A and the mini skid steer pocket opening 52A into the mini skid steer pocket 20A, placing the upper end 14MU thereof into the mini saddle 50A and latching the lower end 14ML thereof by inserting the engagement/latching pin(s) 14ME into the latch pin receiving hole(s) 48A. Of course, for disengaging the mini skid steer implements mount 14M, the engagement/latching pin(s) 14ME are removed from the receiving hole(s) 48A and the mini skid steer implements mount 14M is retracted back out through the mini skid steer pocket opening 52A and the passage opening 22A.

Figure 7:
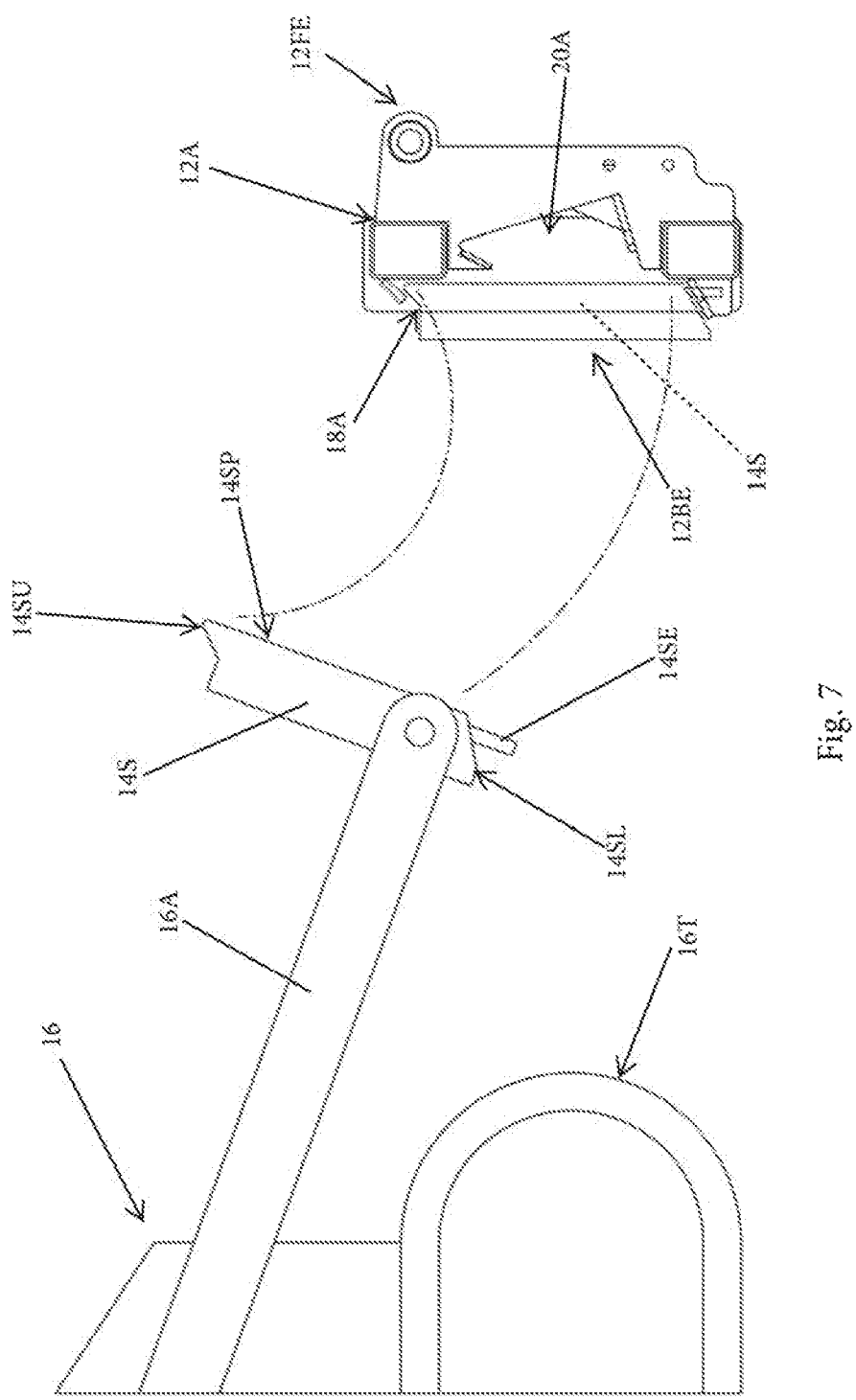
FIG. 7 is a cross section view of the securement frame as shown in FIG. 5 and a diagrammatic skid steer machine depicting the method of selectively attaching a standard steer skid mount to the hydraulic auger and securement frame shown in FIG. 1.
Figure 8:
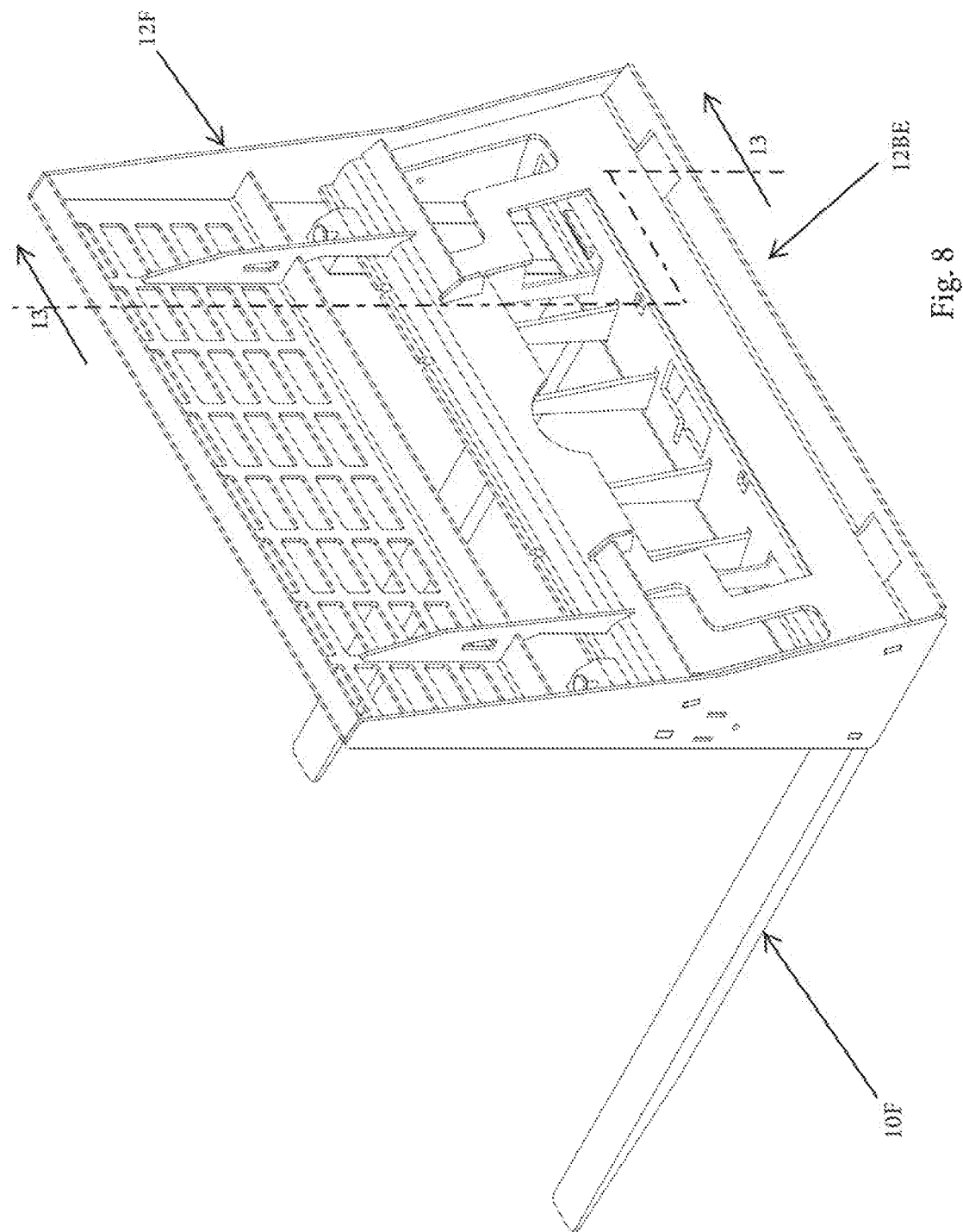
FIG. 8 is a perspective view of a lifting forks implement and securement frame constructed in accordance with the principles of the present invention for selectively attaching to different skid steer implement mounts such as mini steer skid mounts and standard steer skid mounts.
Figure 9:
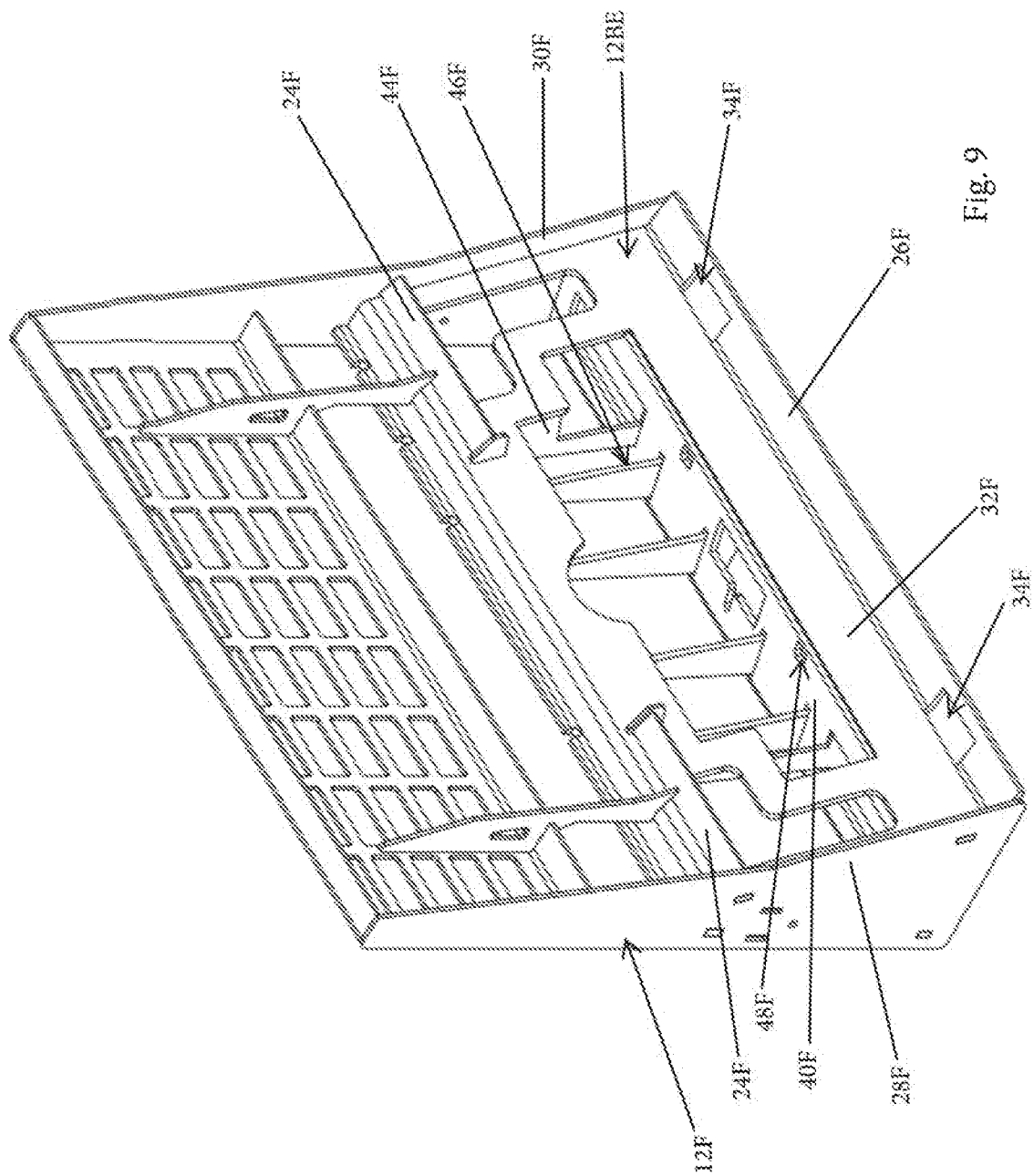
FIG. 9 is a another perspective view similar to FIG. 8 but with the lifting forks removed from the securement frame.
Figure 10:
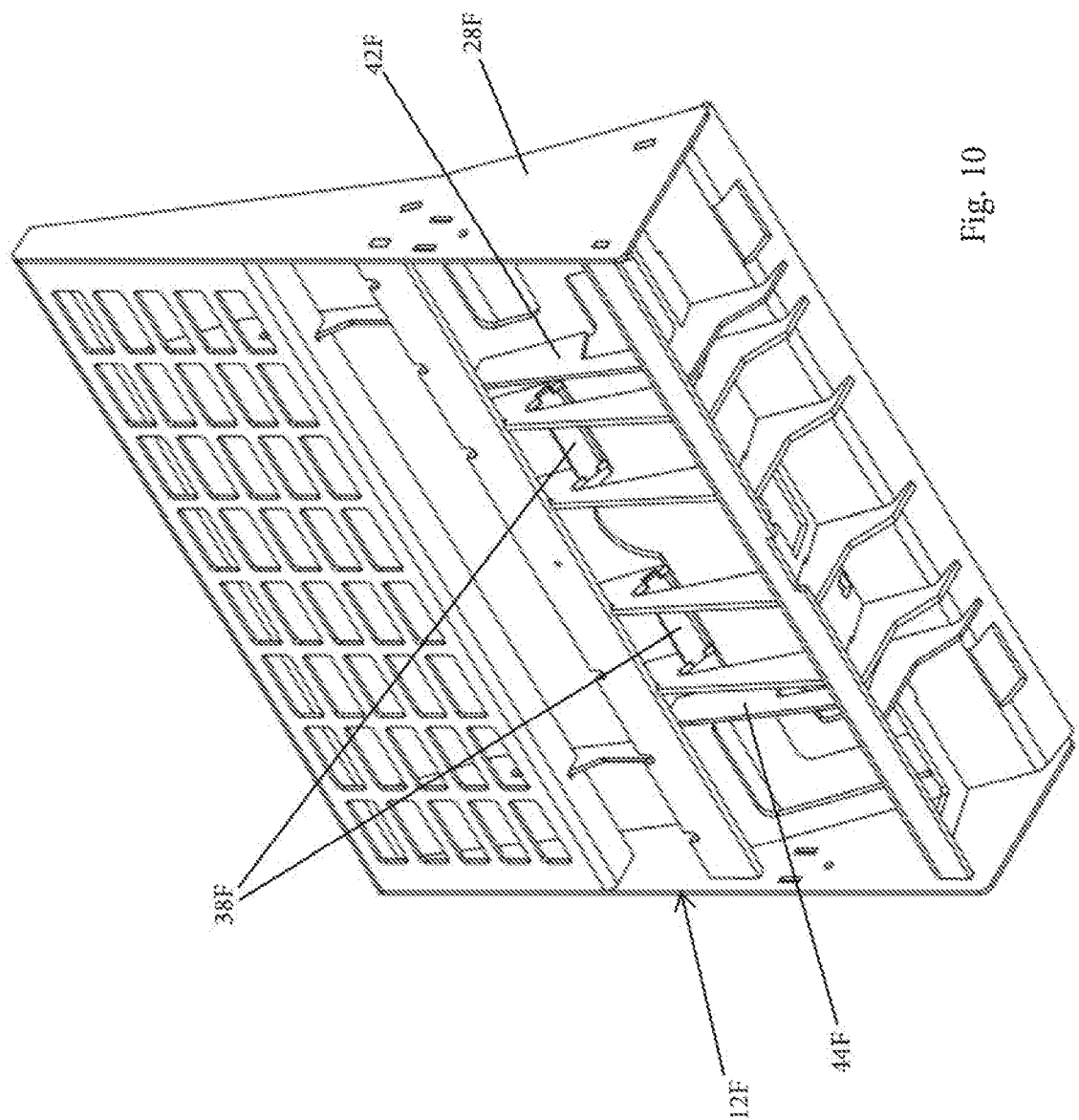
FIG. 10 is perspective view of the securement frame shown in FIG. 9.
Figure 11:
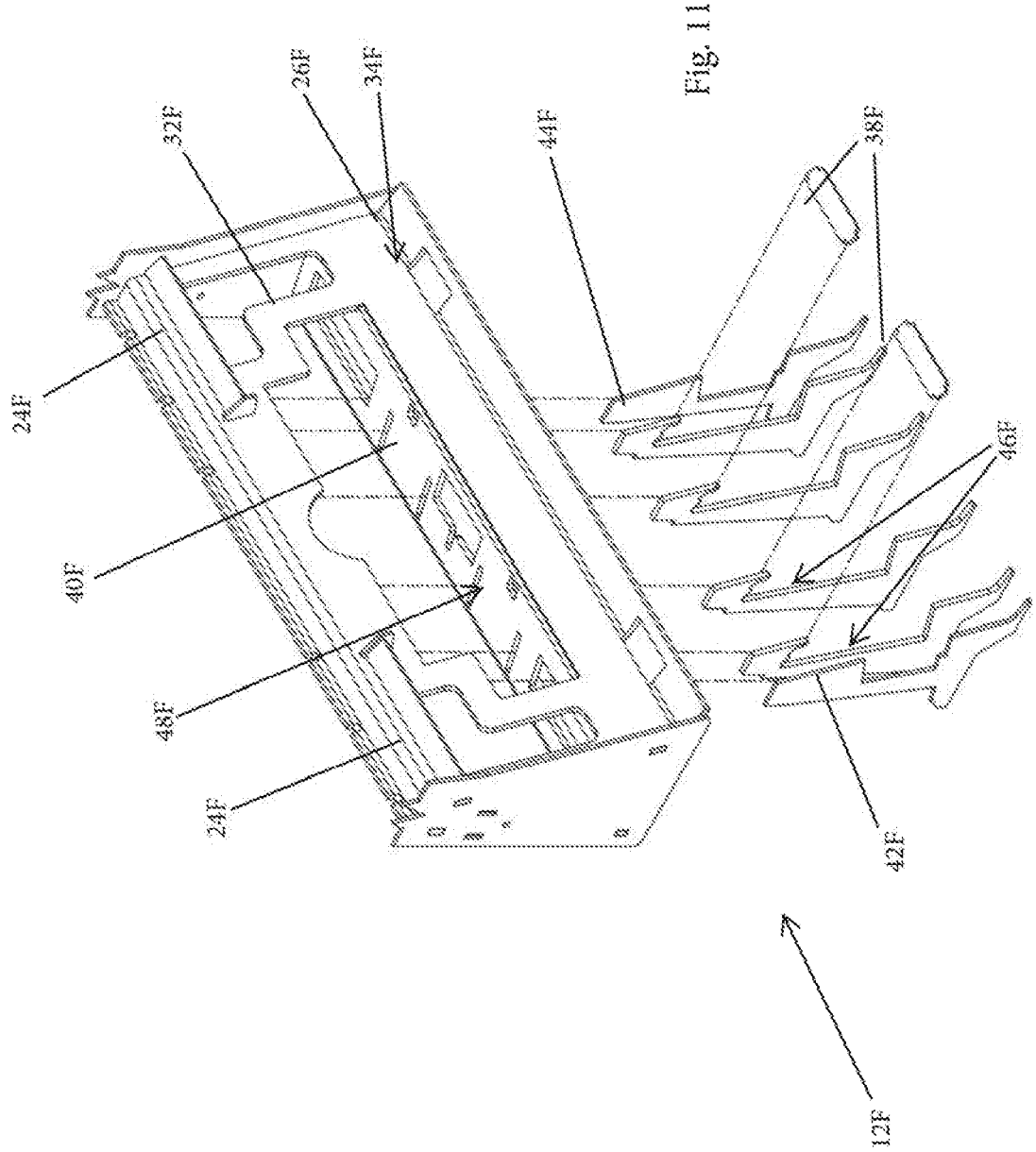
FIG. 11 is an exploded partial perspective view of the securement frame shown in FIG. 9, as seen from the back end.
Figure 12:
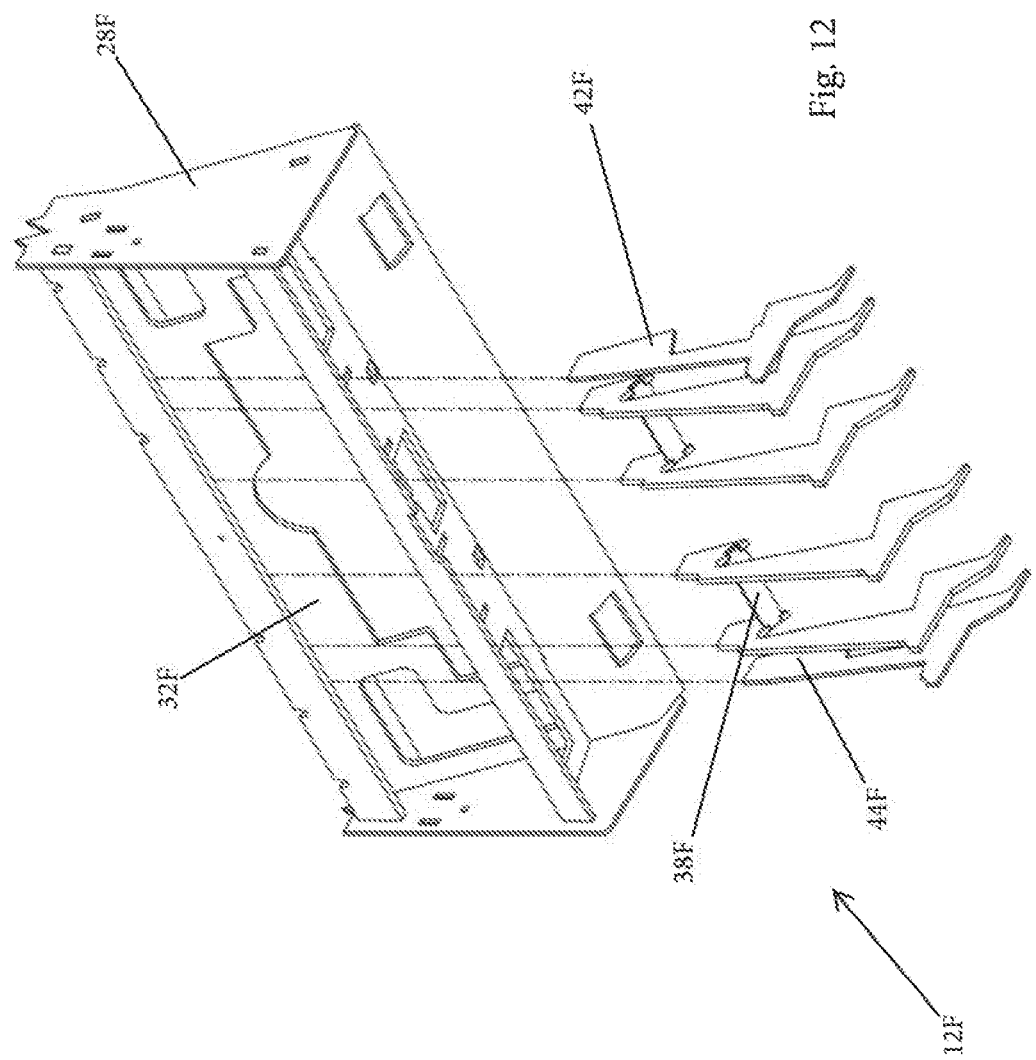
FIG. 12 is an exploded partial perspective view of the securement frame shown in FIG. 11, as seen from the front end.

For attaching the auger implement 10A to the standard skid steer implements mount 14S, as depicted in FIG. 7, the standard skid steer implements mount 14S is inserted from the back end 12BE of the securement frame 12A through the standard skid steer pocket opening and into the standard skid steer pocket 18A, placing the upper end 14SU thereof into the standard saddle 36A and latching the lower end 14SL thereof by inserting the engagement/latching pin(s) 14SE into the latch pin receiving hole(s) 34A. For disengaging the standard skid steer implements mount 14S, the engagement/latching pin(s) 14SE are removed from the receiving hole(s) 34A and the standard skid steer implements mount 14S is retracted back out through the standard skid steer pocket opening.

Referring now more particularly to FIGS. 8-15, the standard skid steer pocket 18F is shown and defined between upper plate(s) 24F, lower plate(s) 26F, left side plate or surface 28F, right side plate or surface 30F and back wall surface(s) 32F. Of course, an opening is provided (not numbered) from the back end 12BE of the securement frame 12F into the standard steer skid pocket 18F wherethrough a standard skid steer implement mount 14S can be inserted into the standard steer skid pocket 18F for engagement therewith. The lower plate(s) 26F are provided with latch pin receiving hole(s) 34F adapted to receive/engage with the engagement/latching mechanism or spring-loaded pins 14SE of the standard skid steer implements mount 14S and latch the lower end 14SL thereof to the lower plate(s) 26F or lower end of the standard skid steer pocket 18F.

Figure 13:
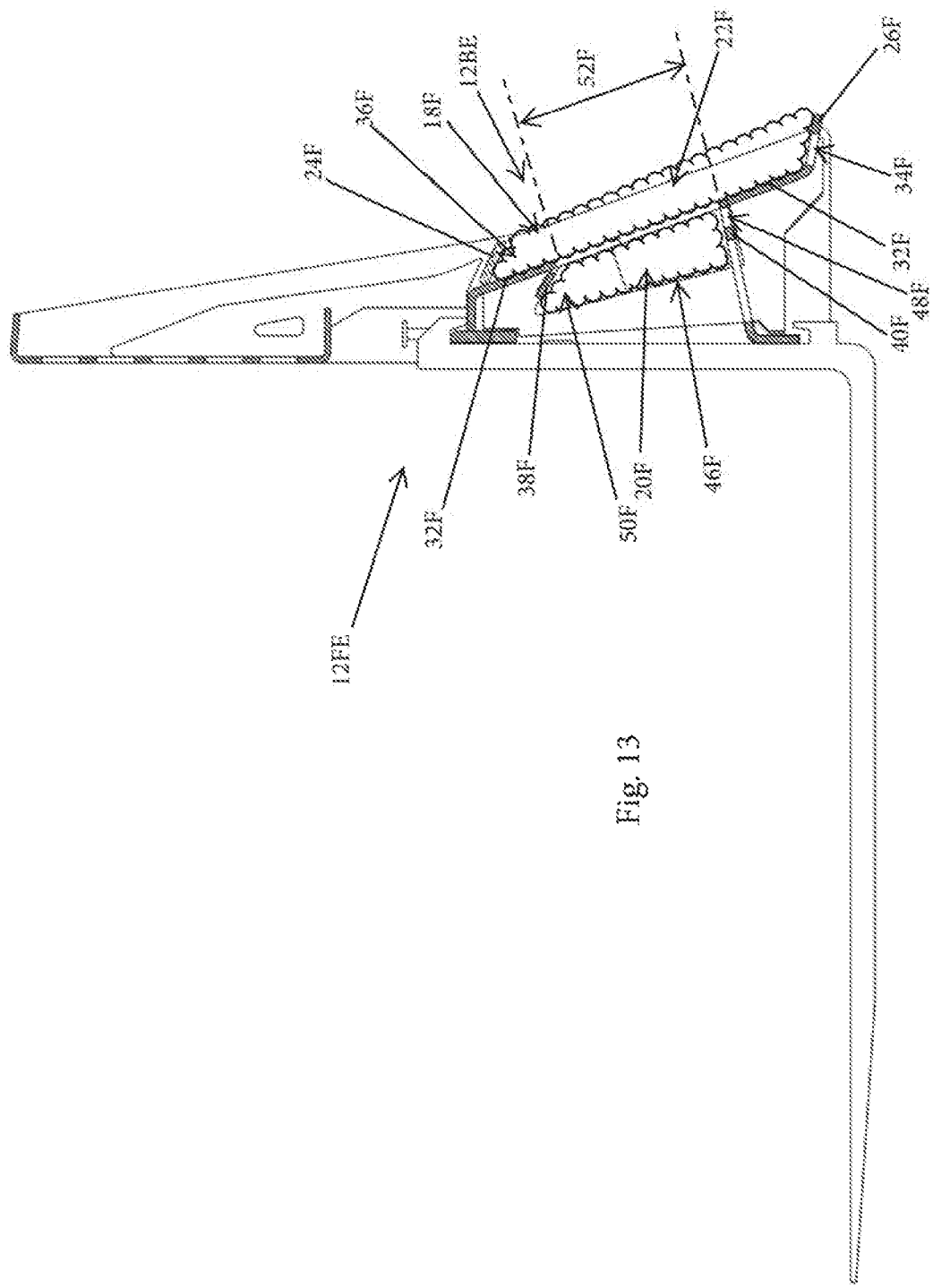
FIG. 13 is a cross section view of the lifting forks implement and the securement frame shown in FIG. 8 taken along line 13-13.

As best seen in FIG. 13 wherein the standard skid steer pocket 18F is diagrammatically depicted in cross section with cloud lines, a saddle 36F is formed between the upper plate(s) 24F and the back wall surface(s) 32F between the left side plate or surface 28F and the right side plate or surface 30F. The saddle 36F is sized and adapted to receive the upper end 14SU of the standard skid steer implement mounts 14S.

The mini skid steer pocket 20F is shown and defined between upper plate(s) 38F, lower plate(s) 40F, left side plate or surface 42F, right side plate or surface 44F and back wall surface(s) 46F. The lower plate(s) 40F are provided with latch pin receiving hole(s) 48F which are adapted to receive/engage with the engagement/latching mechanism or spring-loaded pins 14ME of the mini skid steer implements mount 14M and latch the lower end 14ML thereof to the lower plate(s) 40F or lower end of the mini skid steer pocket 20F.

As best seen in FIG. 13 wherein the mini skid steer pocket 20F is also diagrammatically depicted in cross section with cloud lines, a saddle 50F is formed between the upper plate(s) 38F and the back wall surface(s) 46F between the left side plate or surface 42F and the right side plate or surface 44F. The saddle 50F is sized and adapted to receive the upper end 14MU of the mini skid steer implement mounts 14M.

Figure 14:
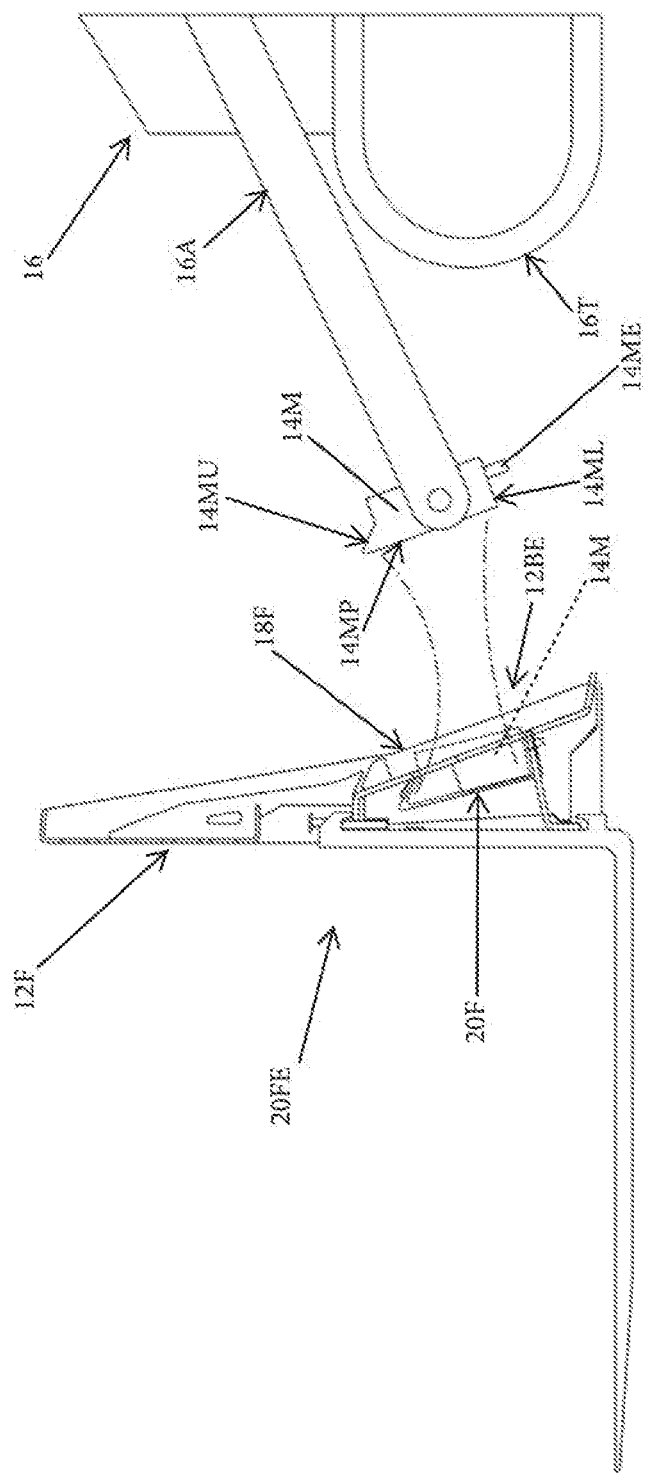
FIG. 14 is a cross section view of the lifting forks implement and securement frame as shown in FIG. 13 and a diagrammatic skid steer machine depicting the method of selectively attaching a mini steer skid mount to the lifting forks and securement frame shown in FIG. 8.

A mini skid steer pocket opening generally designated by the numeral/arrow 52F is defined generally between the upper plate(s) 38F, lower plate(s) 40F, left side plate or surface 42F and right side plate or surface 44F and communicates with the passage opening 22F extending through the standard steer skid pocket 18F. Accordingly, as depicted in FIG. 14, for attaching the forks implement 10F to the mini skid steer implements mount 14M, the mini skid steer implements mount 14M is inserted from the back end 12BE of the securement frame 12F through the passage opening 22F and the mini skid steer pocket opening 52F into the mini skid steer pocket 20F, placing the upper end 14MU thereof into the mini saddle 50F and latching the lower end 14ML thereof by inserting the engagement/latching pin(s) 14ME into the latch pin receiving hole(s) 48F. For disengaging the mini skid steer implements mount 14M, the engagement/latching pin(s) 14ME are removed from the receiving hole(s) 48F and the mini skid steer implements mount 14M is retracted back out through the mini skid steer pocket opening 52F and the passage opening 22F.

Figure 15:
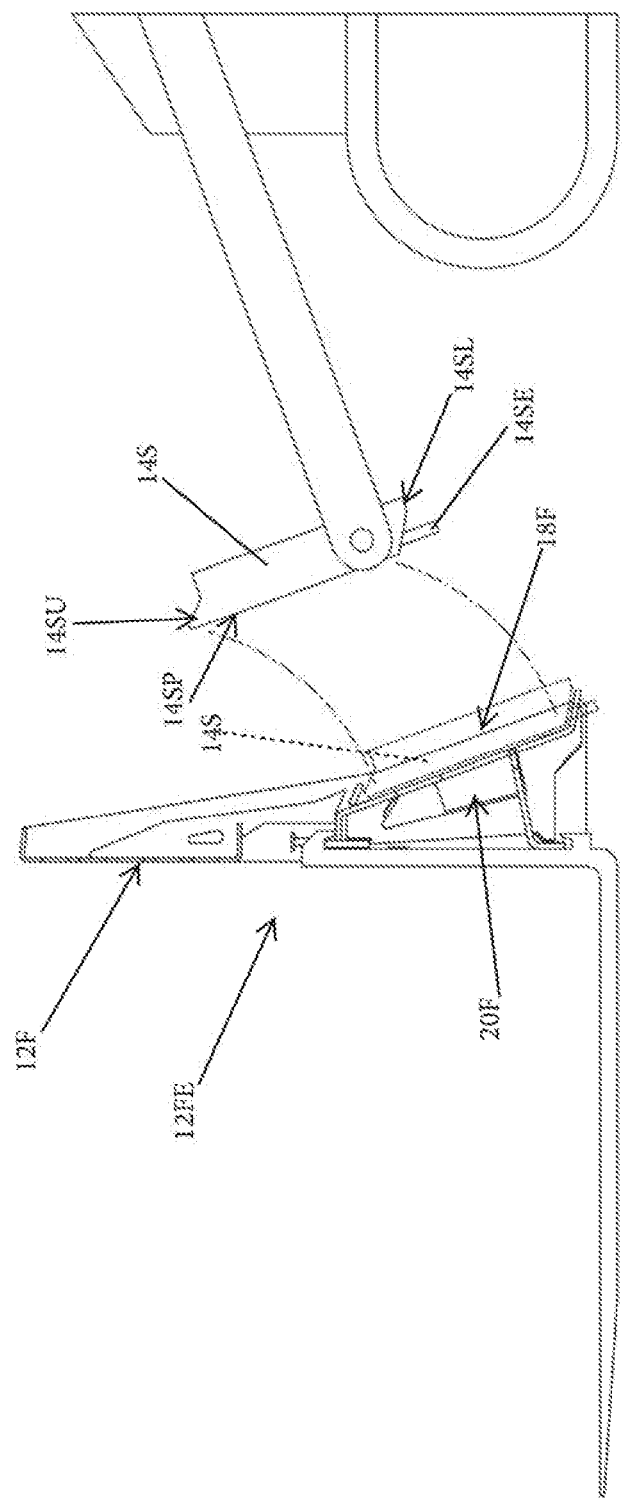
FIG. 15 is a cross section view of the lifting forks implement and securement frame as shown in FIG. 13 and a diagrammatic skid steer machine depicting the method of selectively attaching a standard steer skid mount to the lifting forks and securement frame shown in FIG. 8.
Figure 16:
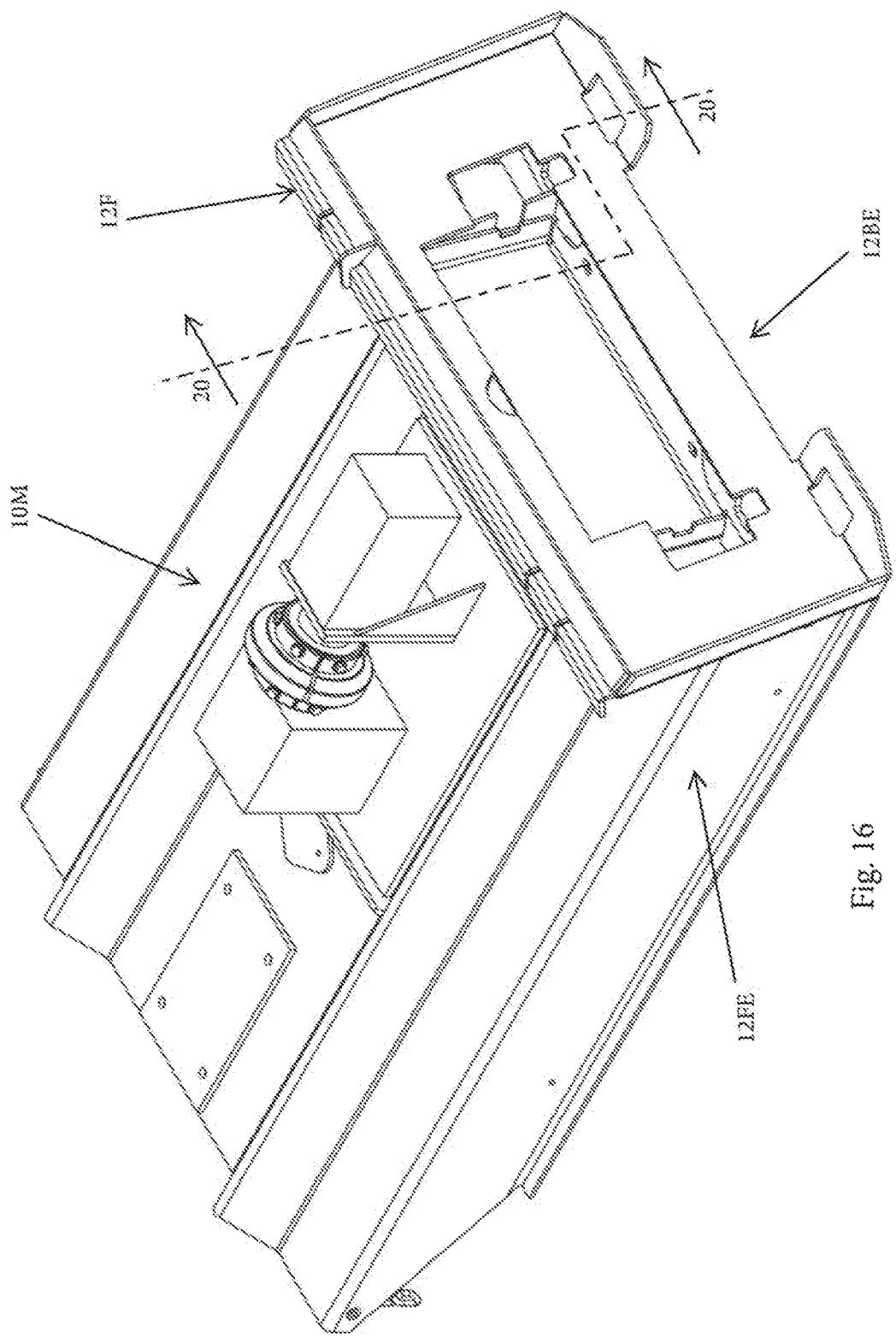
FIG. 16 is a perspective view of a hydraulic mower implement and securement frame constructed in accordance with the principles of the present invention for selectively attaching to different skid steer implement mounts such as mini steer skid mounts and standard steer skid mounts.
Figure 17:
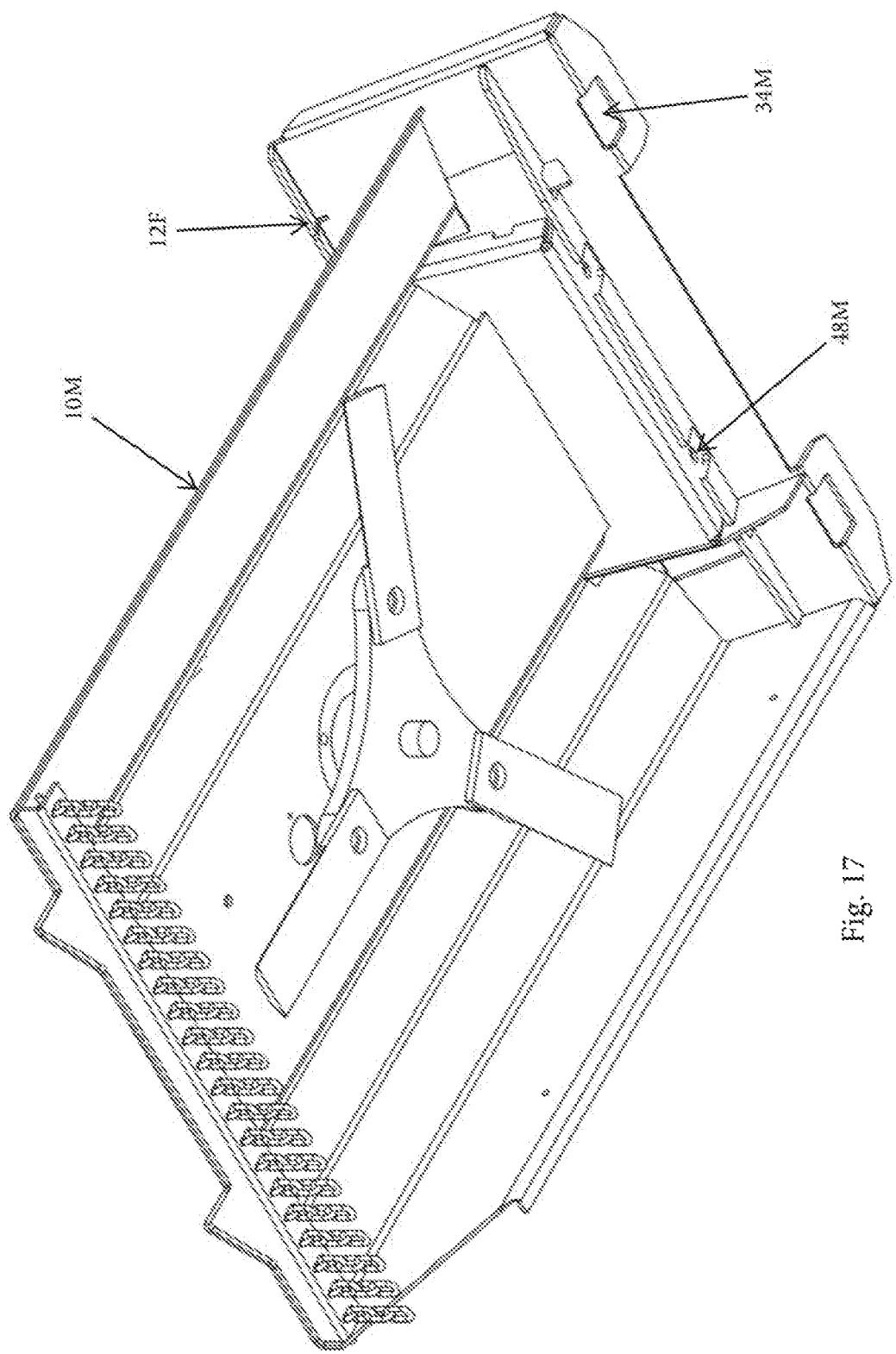
FIG. 17 is another perspective view of the mower and securement frame shown in FIG. 16.
Figure 18:
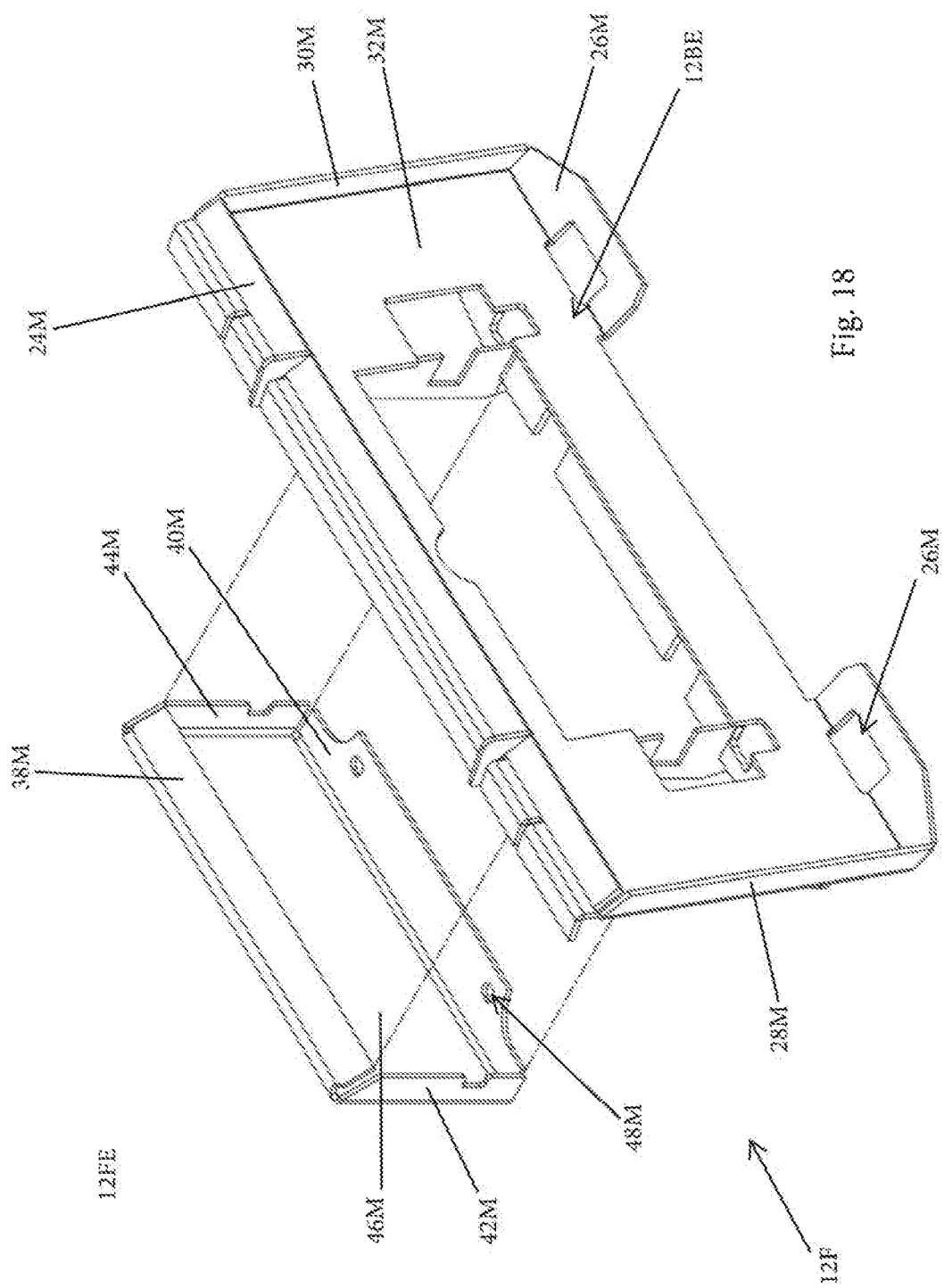
FIG. 18 is an exploded perspective view of the securement frame shown in FIG. 16, as seen from the back end.
Figure 19:
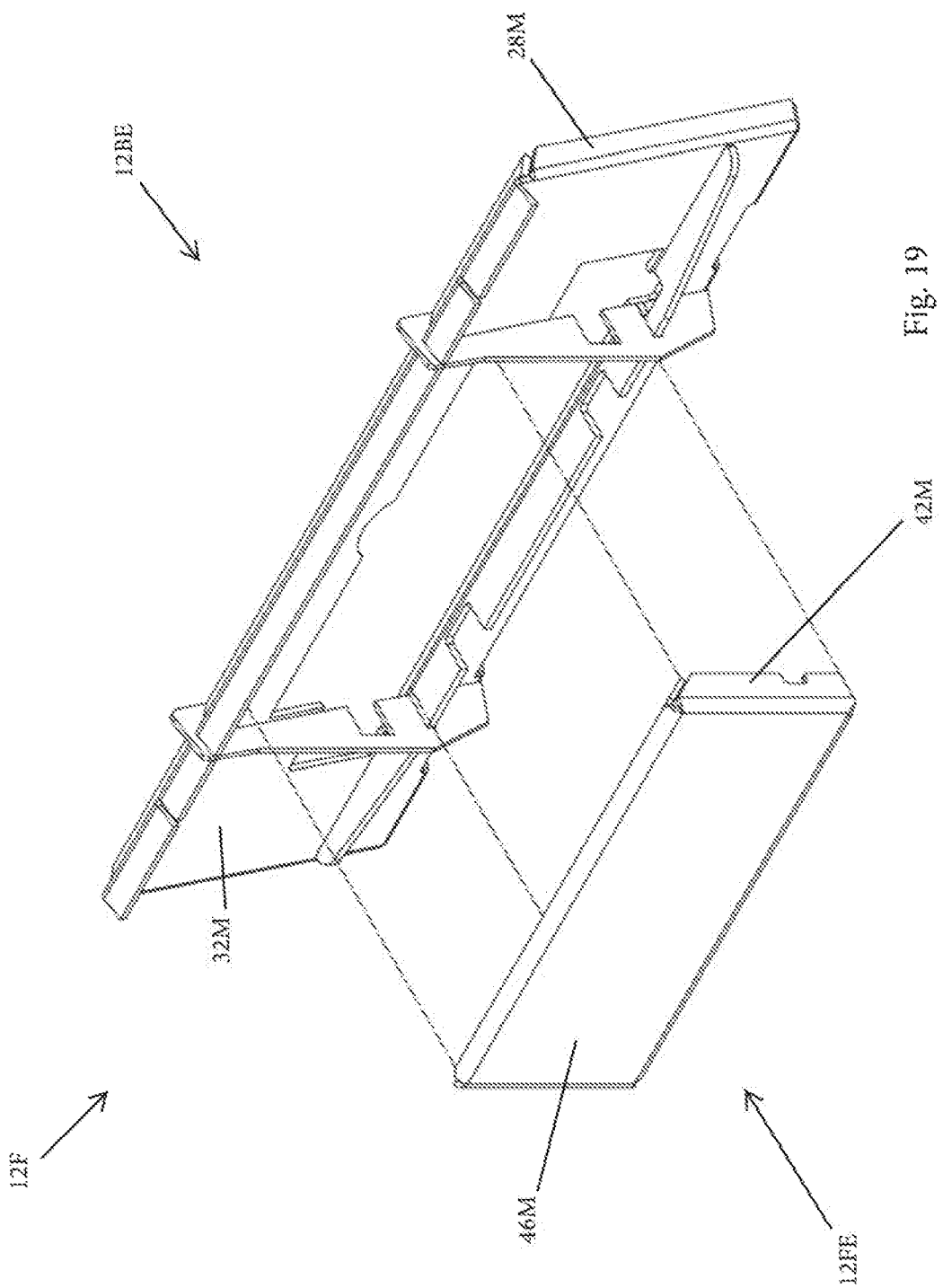
FIG. 19 is an exploded perspective view of the securement frame shown in FIG. 18, as seen from the front end.

For attaching the forks implement 10F to the standard skid steer implements mount 14S, as depicted in FIG. 15, the standard skid steer implements mount 14S is inserted from the back end 12BE of the securement frame 12F through the standard skid steer pocket opening and into the standard skid steer pocket 18F, placing the upper end 14SU thereof into the standard saddle 36F and latching the lower end 14SL thereof by inserting the engagement/latching pin(s) 14SE into the latch pin receiving hole(s) 34F. For disengaging the standard skid steer implements mount 14S, the engagement/latching pin(s) 14SE are removed from the receiving hole(s) 34F and the standard skid steer implements mount 14S is retracted back out through the standard skid steer pocket opening.

Referring now more particularly to FIGS. 16-22, the standard skid steer pocket 18M is shown and defined between upper plate(s) 24M, lower plate(s) 26M, left side plate or surface 28M, right side plate or surface 30M and back wall surface(s) 32M. Of course, an opening is provided (not numbered) from the back end 12BE of the securement frame 12M into the standard steer skid pocket 18M wherethrough a standard skid steer implement mount 14S can be inserted into the standard steer skid pocket 18M for engagement therewith. The lower plate(s) 26M are provided with latch pin receiving hole(s) 34M adapted to receive/engage with the engagement/latching mechanism or spring-loaded pins 14SE of the standard skid steer implements mount 14S and latch the lower end 14SL thereof to the lower plate(s) 26M or lower end of the standard skid steer pocket 18M.

Figure 20:
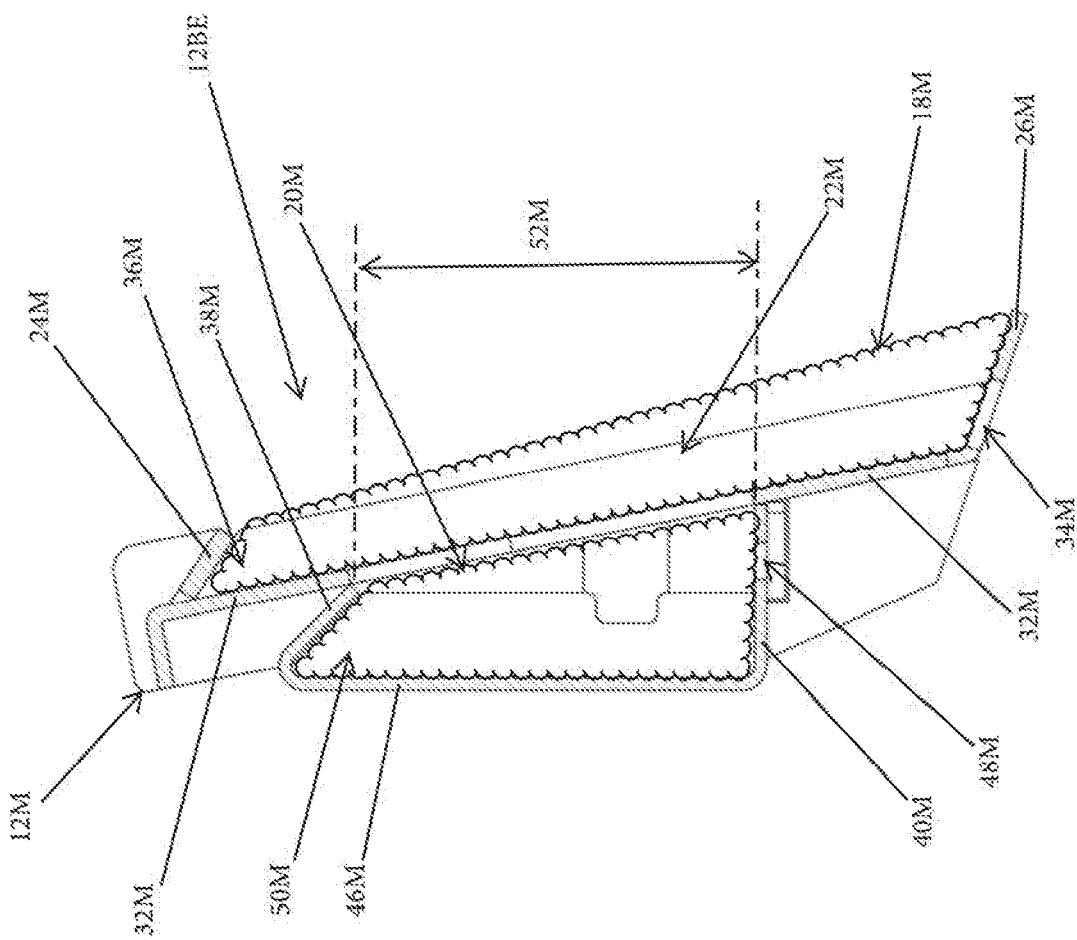
FIG. 20 is a cross section view of the securement frame shown in FIG. 16 taken along line 20-20.

As best seen in FIG. 20 wherein the standard skid steer pocket 18M is diagrammatically depicted in cross section with cloud lines, a saddle 36M is formed between the upper plate(s) 24M and the back wall surface(s) 32M between the left side plate or surface 28M and the right side plate or surface 30M. The saddle 36M is sized and adapted to receive the upper end 14SU of the standard skid steer implement mounts 14S.

The mini skid steer pocket 20M is shown and defined between upper plate(s) 38M, lower plate(s) 40M, left side plate or surface 42M, right side plate or surface 44M and back wall surface(s) 46M. The lower plate(s) 40M are provided with latch pin receiving hole(s) 48M which are adapted to receive/engage with the engagement/latching mechanism or spring-loaded pins 14ME of the mini skid steer implements mount 14M and latch the lower end 14ML thereof to the lower plate(s) 40M or lower end of the mini skid steer pocket 20M.

As best seen in FIG. 20 wherein the mini skid steer pocket 20M is also diagrammatically depicted in cross section with cloud lines, a saddle 50M is formed between the upper plate(s) 38M and the back wall surface(s) 46M between the left side plate or surface 42M and the right side plate or surface 44M. The saddle 50MF is sized and adapted to receive the upper end 14MU of the mini skid steer implement mounts 14M.

Figure 21:
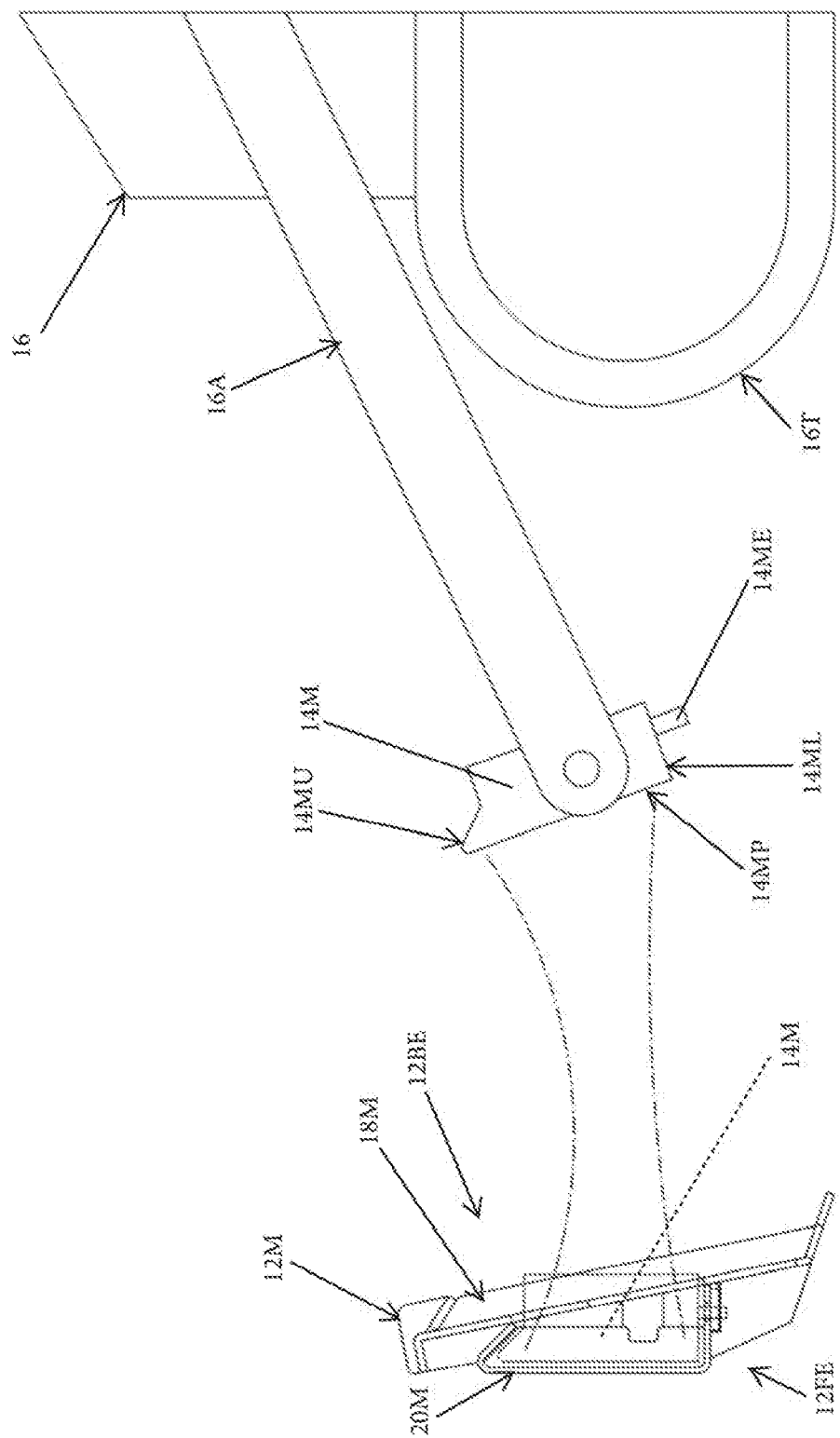
FIG. 21 is a cross section view of the securement frame as shown in FIG. 20 and a diagrammatic skid steer machine depicting the method of selectively attaching a mini steer skid mount to the mower and securement frame shown in FIG. 16.

A mini skid steer pocket opening generally designated by the numeral/arrow 52M is defined generally between the upper plate(s) 38M, lower plate(s) 40M, left side plate or surface 42M and right side plate or surface 44M and communicates with the passage opening 22M extending through the standard steer skid pocket 18M. Accordingly, as depicted in FIG. 21, for attaching the mower implement 10M to the mini skid steer implements mount 14M, the mini skid steer implements mount 14M is inserted from the back end 12BE of the securement frame 12M through the passage opening 22M and the mini skid steer pocket opening 52M into the mini skid steer pocket 20M, placing the upper end 14MU thereof into the mini saddle 50M and latching the lower end 14ML thereof by inserting the engagement/latching pin(s) 14ME into the latch pin receiving hole(s) 48M. For disengaging the mini skid steer implements mount 14M, the engagement/latching pin(s) 14ME are removed from the receiving hole(s) 48M and the mini skid steer implements mount 14M is retracted back out through the mini skid steer pocket opening 52M and the passage opening 22M.

Figure 22:
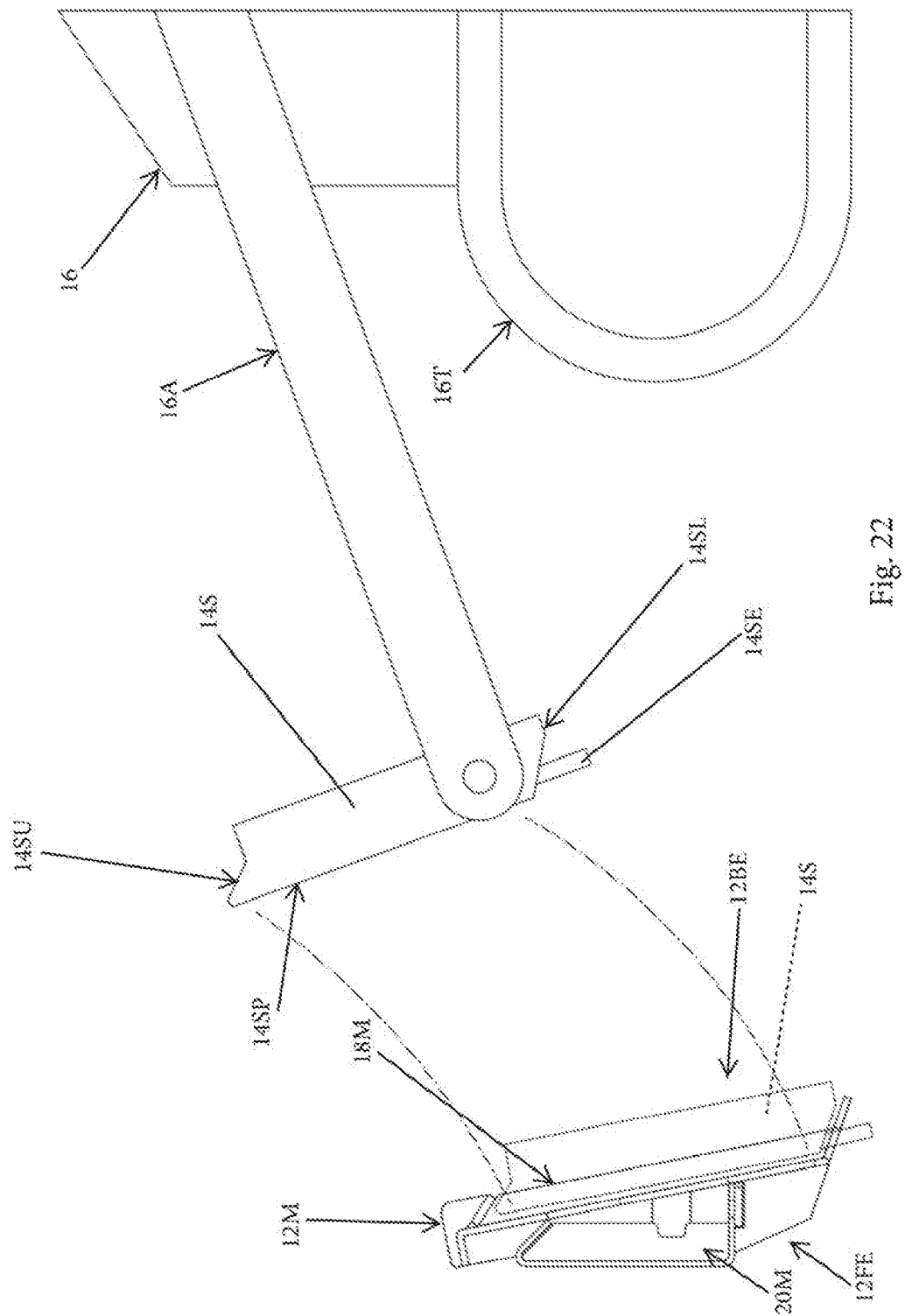
FIG. 22 is a cross section view of the securement frame as shown in FIG. 20 and a diagrammatic skid steer machine depicting the method of selectively attaching a standard steer skid mount to the mower and securement frame shown in FIG. 16.
Figure 23:
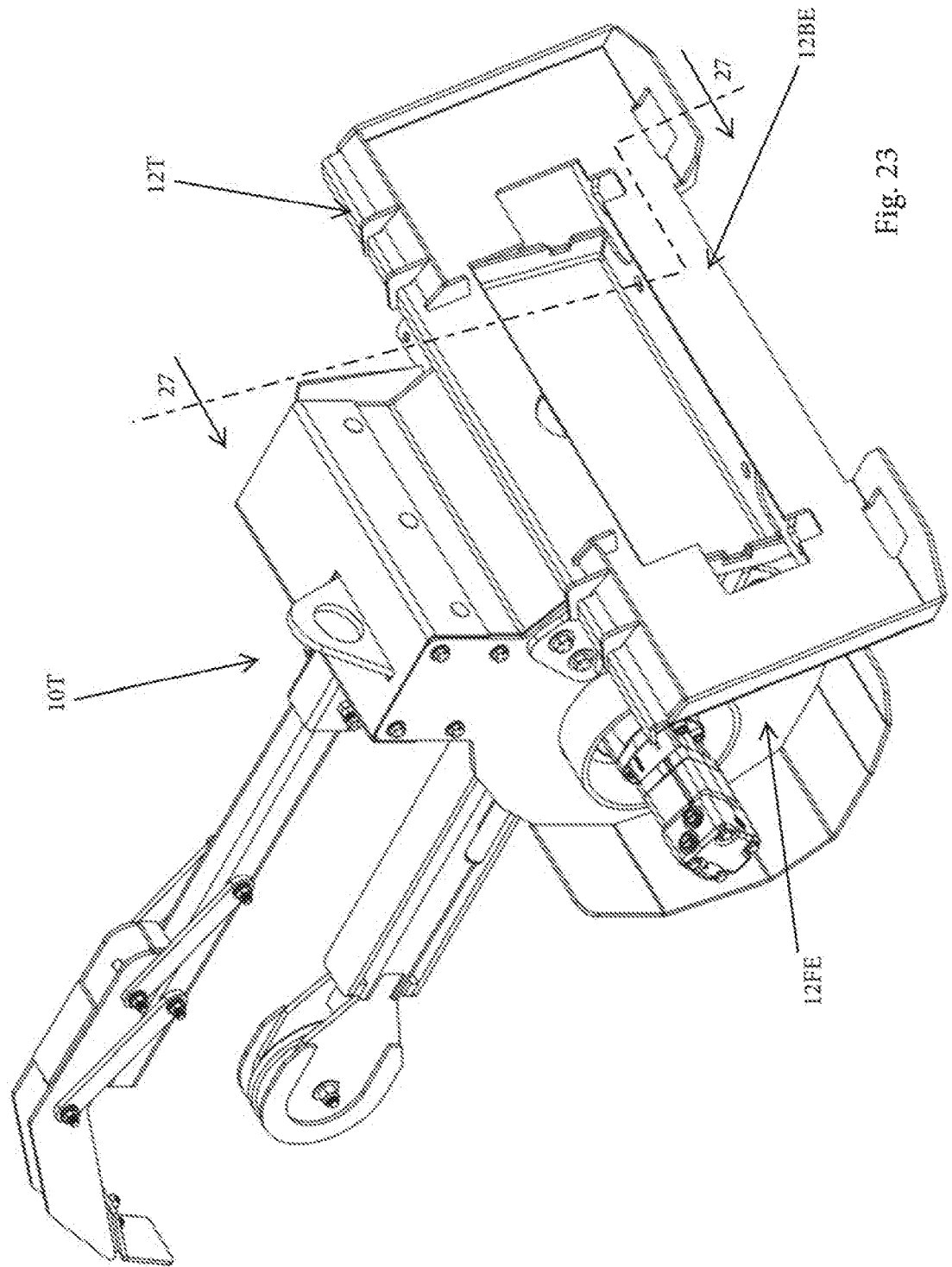
FIG. 23 is a perspective view of a hydraulic trencher implement and securement frame constructed in accordance with the principles of the present invention for selectively attaching to different skid steer implement mounts such as mini steer skid mounts and standard steer skid mounts.
Figure 24:
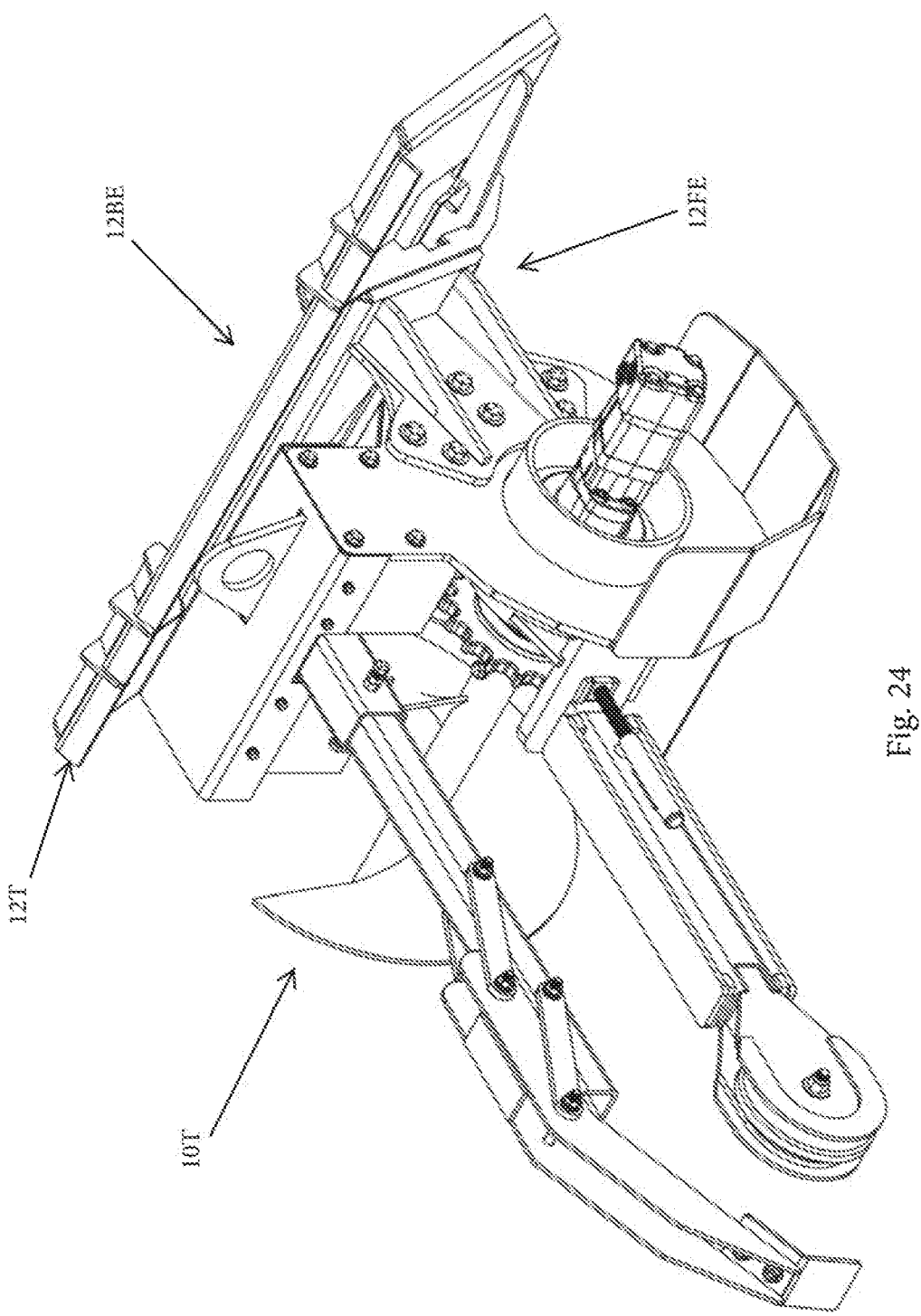
FIG. 24 is another perspective view of the trencher and securement frame shown in FIG. 23.
Figure 25:
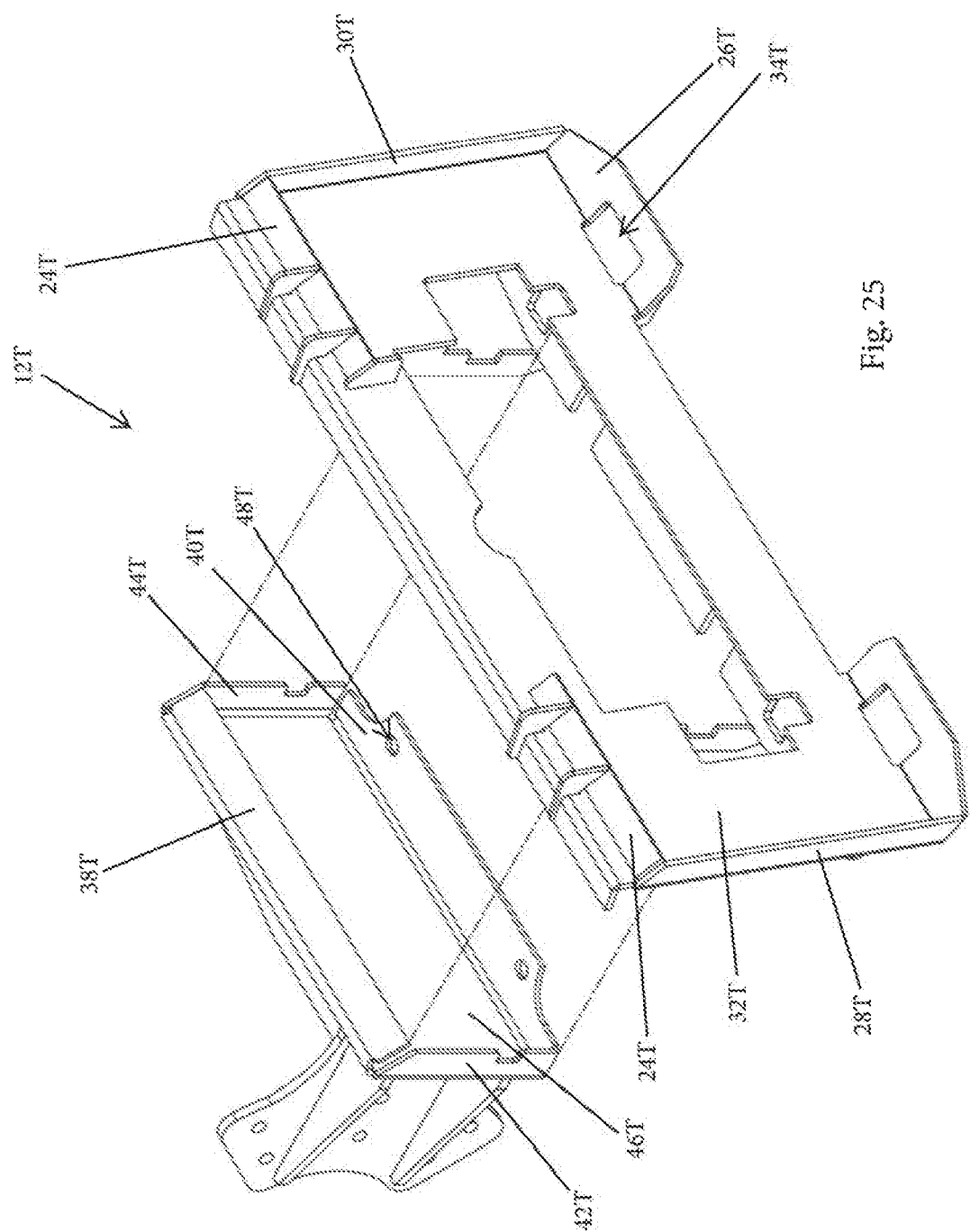
FIG. 25 is an exploded perspective view of the securement frame shown in FIG. 23, as seen from the back end.
Figure 26:
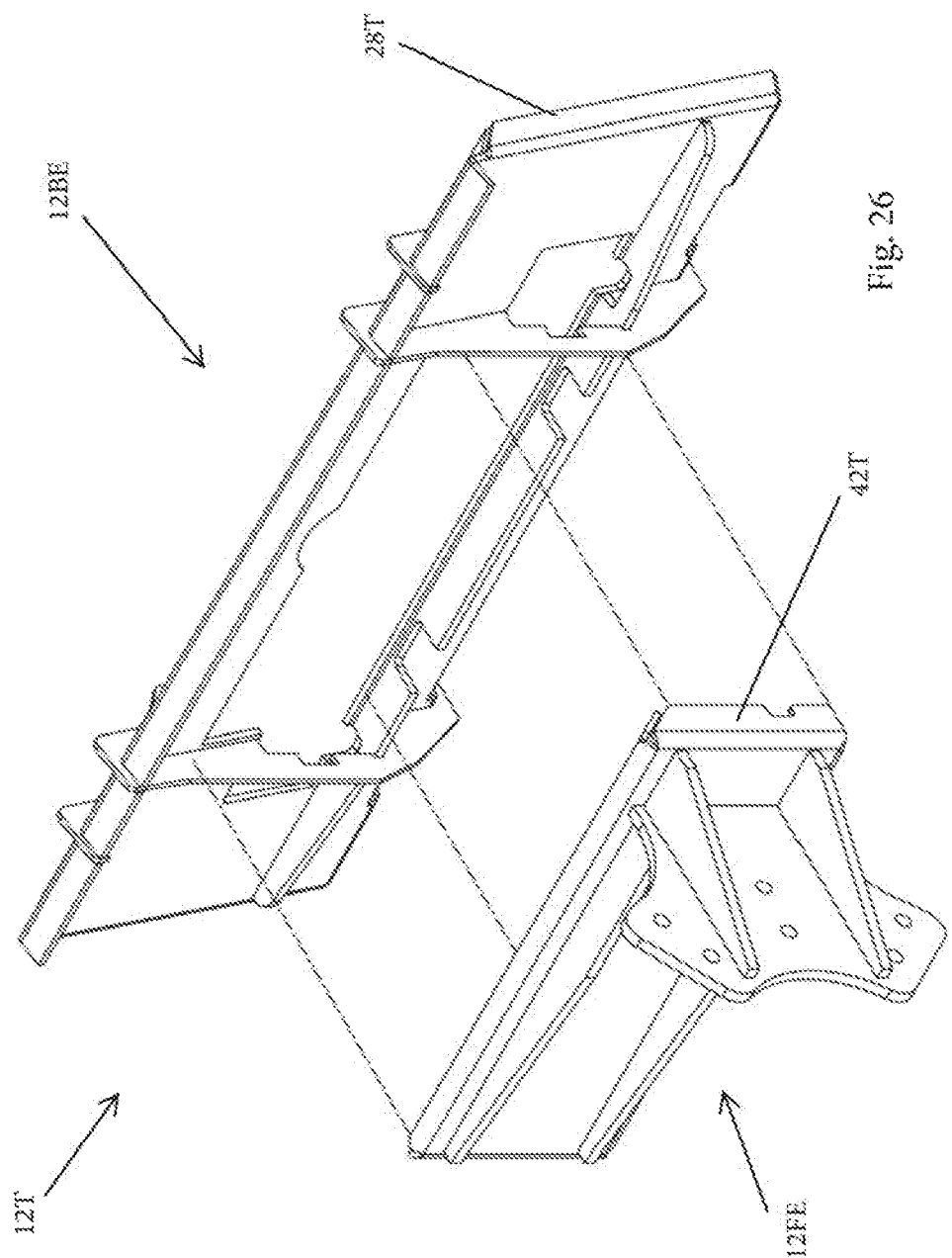
FIG. 26 is an exploded perspective view of the securement frame shown in FIG. 25, as seen from the front end.

For attaching the mower implement 10M to the standard skid steer implements mount 14S, as depicted in FIG. 22, the standard skid steer implements mount 14S is inserted from the back end 12BE of the securement frame 12M through the standard skid steer pocket opening and into the standard skid steer pocket 18M, placing the upper end 14SU thereof into the standard saddle 36M and latching the lower end 14SL thereof by inserting the engagement/latching pin(s) 14SE into the latch pin receiving hole(s) 34M. For disengaging the standard skid steer implements mount 14S, the engagement/latching pin(s) 14SE are removed from the receiving hole(s) 34M and the standard skid steer implements mount 14S is retracted back out through the standard skid steer pocket opening.

Referring now more particularly to FIGS. 23-29, the standard skid steer pocket 18T is shown and defined between upper plate(s) 24T, lower plate(s) 26T, left side plate or surface 28T, right side plate or surface 30T and back wall surface(s) 32T. Of course, an opening is provided (not numbered) from the back end 12BE of the securement frame 12T into the standard steer skid pocket 18T wherethrough a standard skid steer implement mount 14S can be inserted into the standard steer skid pocket 18T for engagement therewith. The lower plate(s) 26T are provided with latch pin receiving hole(s) 34T adapted to receive/engage with the engagement/latching mechanism or spring-loaded pins 14SE of the standard skid steer implements mount 14S and latch the lower end 14SL thereof to the lower plate(s) 26T or lower end of the standard skid steer pocket 18T.

Figure 27:
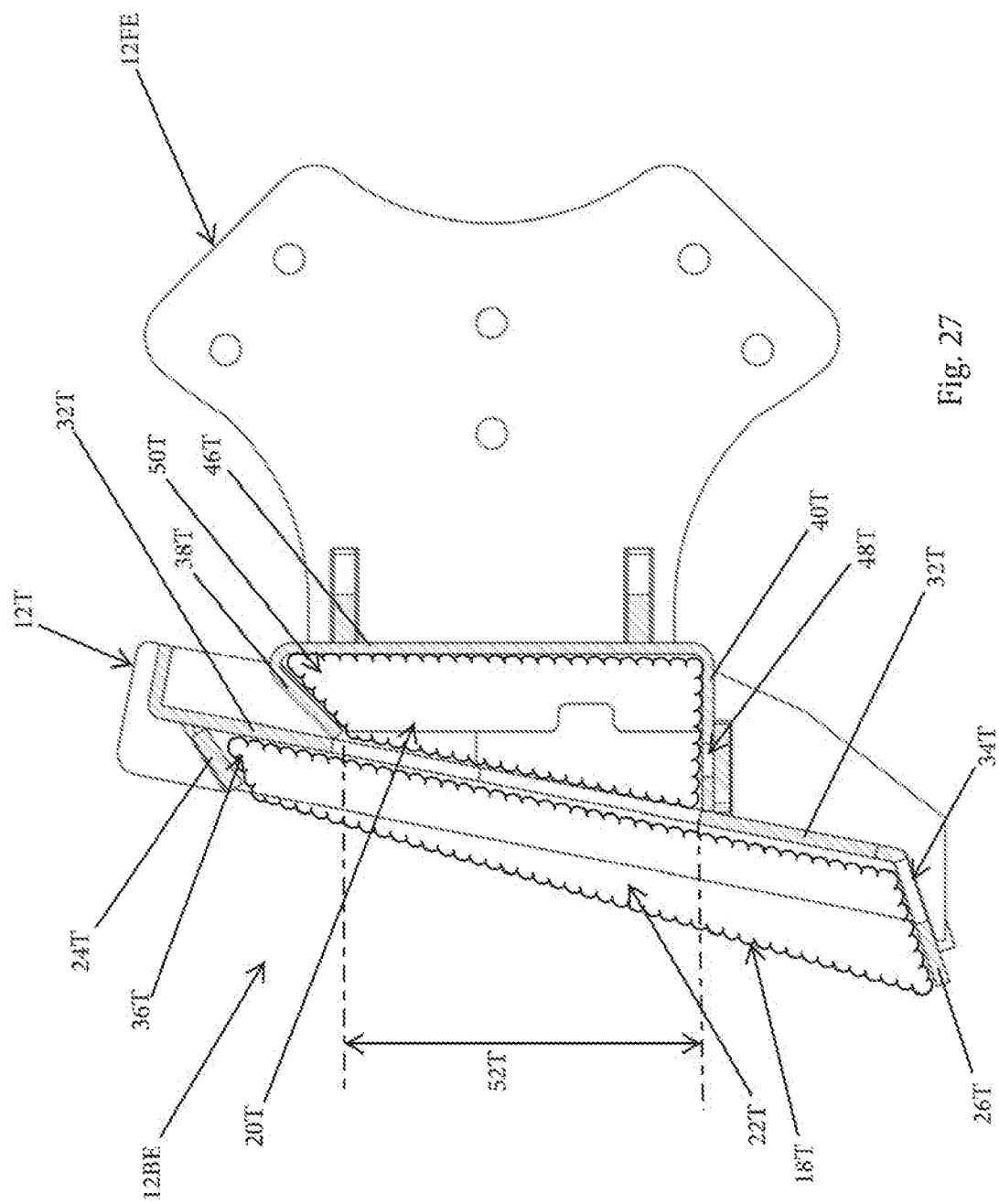
FIG. 27 is a cross section view of the securement frame shown in FIG. 23 taken along line 23-23.

As best seen in FIG. 27 wherein the standard skid steer pocket 18T is diagrammatically depicted in cross section with cloud lines, a saddle 36T is formed between the upper plate(s) 24T and the back wall surface(s) 32T between the left side plate or surface 28T and the right side plate or surface 30T. The saddle 36T is sized and adapted to receive the upper end 14SU of the standard skid steer implement mounts 14S.

The mini skid steer pocket 20T is shown and defined between upper plate(s) 38T, lower plate(s) 40T, left side plate or surface 42T, right side plate or surface 44T and back wall surface(s) 46T. The lower plate(s) 40T are provided with latch pin receiving hole(s) 48T which are adapted to receive/engage with the engagement/latching mechanism or spring-loaded pins 14ME of the mini skid steer implements mount 14M and latch the lower end 14ML thereof to the lower plate(s) 40T or lower end of the mini skid steer pocket 20T.

As best seen in FIG. 27 wherein the mini skid steer pocket 20T is also diagrammatically depicted in cross section with cloud lines, a saddle 50T is formed between the upper plate(s) 38T and the back wall surface(s) 46T between the left side plate or surface 42T and the right side plate or surface 44T. The saddle 50T is sized and adapted to receive the upper end 14MU of the mini skid steer implement mounts 14M.

Figure 28:
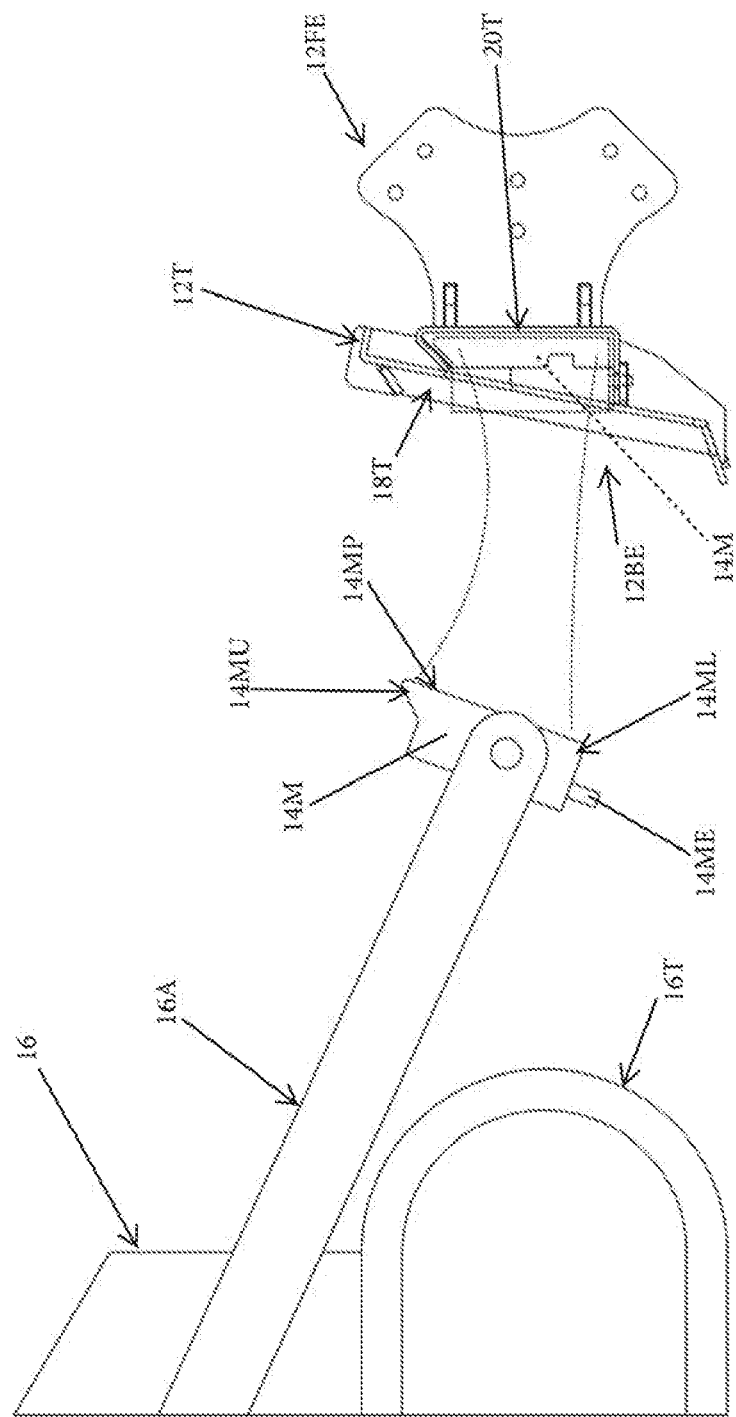
FIG. 28 is a cross section view of the securement frame as shown in FIG. 27 and a diagrammatic skid steer machine depicting the method of selectively attaching a mini steer skid mount to the trencher and securement frame shown in FIG. 23.

A mini skid steer pocket opening generally designated by the numeral/arrow 52T is defined generally between the upper plate(s) 38T, lower plate(s) 40T, left side plate or surface 42T and right side plate or surface 44T and communicates with the passage opening 22T extending through the standard steer skid pocket 18T. Accordingly, as depicted in FIG. 28, for attaching the trencher implement 10T to the mini skid steer implements mount 14M, the mini skid steer implements mount 14M is inserted from the back end 12BE of the securement frame 12T through the passage opening 22T and the mini skid steer pocket opening 52T into the mini skid steer pocket 20T, placing the upper end 14MU thereof into the mini saddle 50T and latching the lower end 14ML thereof by inserting the engagement/latching pin(s) 14ME into the latch pin receiving hole(s) 48T. For disengaging the mini skid steer implements mount 14M, the engagement/latching pin(s) 14ME are removed from the receiving hole(s) 48T and the mini skid steer implements mount 14M is retracted back out through the mini skid steer pocket opening 52T and the passage opening 22T.

Figure 29:
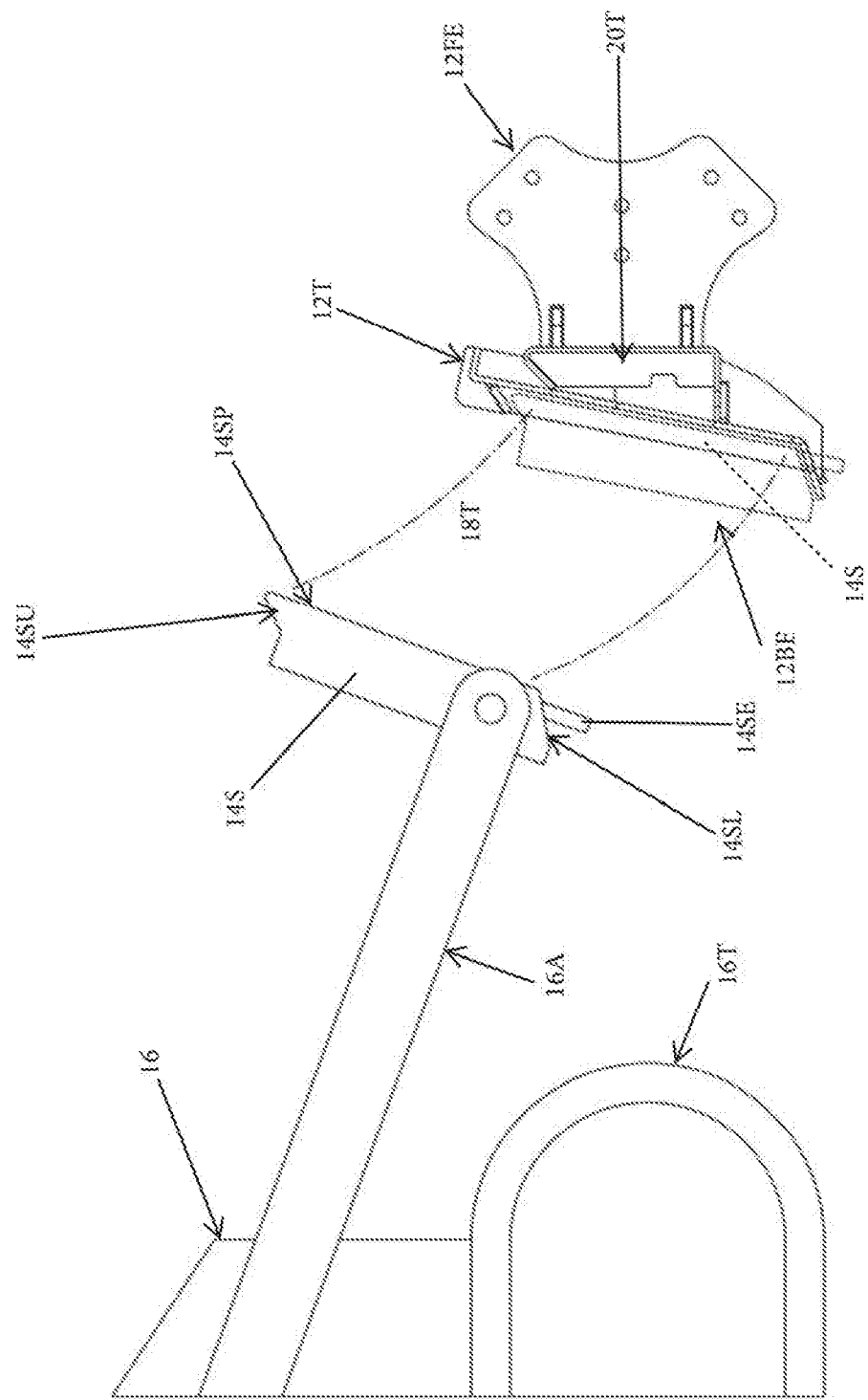
FIG. 29 is a cross section view of the securement frame as shown in FIG. 27 and a diagrammatic skid steer machine depicting the method of selectively attaching a standard steer skid mount to the trencher and securement frame shown in FIG. 23.

For attaching the trencher implement 10T to the standard skid steer implements mount 14S, as depicted in FIG. 29, the standard skid steer implements mount 14S is inserted from the back end 12BE of the securement frame 12T through the standard skid steer pocket opening and into the standard skid steer pocket 18T, placing the upper end 14SU thereof into the standard saddle 36T and latching the lower end 14SL thereof by inserting the engagement/latching pin(s) 14SE into the latch pin receiving hole(s) 34T. For disengaging the standard skid steer implements mount 14S, the engagement/latching pin(s) 14SE are removed from the receiving hole(s) 34TM and the standard skid steer implements mount 14S is retracted back out through the standard skid steer pocket opening.

Advantageously, by defining both the standard steer skid pocket 18 and the mini steer skid pocket 20 in the securement frame 12, they can be located as needed or desired for better accommodating any differences that may exist between the mini skid steer implement mounts 14M and the standard skid steer implement mounts 14S relative to the standard steer skid pocket 18 and many steer skid pocket 20. For example, as shown in FIG. 13, the standard steer skid pocket 18 and the mini steer skid pocket 20 can be located to extend generally along planes which are parallel to one another, and as shown in FIGS. 5, 20 and 27, the standard steer skid pocket 18 and the mini steer skid pocket 20 can be located to extend along planes at an angle with respect to each other/not parallel.

While this invention has been described as having an exemplary design, the present invention may be further modified within the spirit and scope of this disclosure. This application is therefore intended to cover any variations, uses, or adaptations of the invention using its general principles.

What is claimed is:

1. An implement selectively attachable to a first skid steer implements mount and to a second skid steer implements mount, the implement cooperates with a frame comprising:
    a first skid steer pocket, wherein the first skid steer pocket is engageable with the first skid steer implements mount;
    a second skid steer pocket, wherein the second skid steer pocket is engageable with the second skid steer implements mount;
    wherein the second skid steer pocket is located between the implement and the first skid steer pocket;
    a passage opening extending through the first skid steer pocket wherethrough the second skid steer pocket is accessible; and,
    wherein, for attaching the implement to the second skid steer implements mount, the second skid steer implements mount is inserted through the passage opening and engages the second skid steer pocket and, for attaching the implement to the first skid steer implements mount, the first skid steer implements mount engages the first skid steer pocket.

2. The implement of claim 1 wherein:
    the first skid steer implements mount comprises a standard skid steer mounting plate;
    the second skid steer implements mount comprises a mini skid steer mounting plate;
    the mini skid steer mounting plate is smaller than the standard steer skid mounting plate; and,
    the mini skid steer mounting plate is insertable through the passage opening and into the second skid steer pocket.

3. The implement of claim 1 wherein:
    the first skid steer pocket extends generally along a first plane;
    the second skid steer pocket extends generally along a second plane; and,
    the first and second planes are not parallel to one another.

4. The implement of claim 1 wherein:
    the first skid steer pocket extends generally along a first plane;
    the second skid steer pocket extends generally along a second plane; and,
    the first and second planes are parallel to one another.

5. The implement of claim 1 wherein:
    the first skid steer implements mount comprises an upper end;
    the first skid steer pocket comprises a saddle adapted to receive the upper end of the first skid steer implements mount;
    the second skid steer implements mount comprises an upper end;
    the second skid steer pocket comprises a saddle adapted to receive the upper end of the second skid steer mount;
    the second skid steer mount engages the second skid steer pocket by inserting its upper end into the second skid steer saddle; and,
    the first mount engages the first skid steer pocket by inserting its upper end into the first skid steer saddle.

6. The implement of claim 1 wherein:
    the first skid steer implements mount comprises upper and lower ends;
    the first skid steer pocket comprises a saddle adapted to receive the upper end of the first skid steer implements mount;
    the second skid steer implements mount comprises upper and lower ends;
    the second skid steer pocket comprises a saddle adapted to receive the upper end of the second skid steer mount;
    the second skid steer mount engages the second skid steer pocket by inserting its upper end into the second skid steer saddle and latching its lower end to a lower end of the second skid steer pocket; and,
    the first mount engages the first skid steer pocket by inserting its upper end into the first skid steer saddle and latching its lower end to a lower end of the first skid steer pocket.

7. The implement of claim 1 wherein:
    the first skid steer implements mount comprises a first mounting plate having upper and lower ends;
    the first skid steer pocket comprises a saddle adapted to receive the upper end of the first mounting plate;
    the second skid steer implements mount comprises a second mounting plate having upper and lower ends;
    the second skid steer pocket comprises a saddle adapted to receive the upper end of the second mounting plate;
    the second mounting plate is smaller than the first mounting plate;
    the second mounting plate is also smaller than the passage opening whereby the second mounting plate is insertable through the passage opening, and the second mounting plate engages the second skid steer pocket by inserting its upper end into the second skid steer saddle and latching its lower end to a lower end of the second skid steer pocket; and, the first mounting plate engages the first skid steer pocket by inserting its upper end into the first skid steer saddle and latching its lower end to a lower end of the first skid steer pocket.

8. The implement of claim 1 wherein:
the second skid steer implement mount is smaller than the first skid steer implement mount;
the first skid steer pocket is not engageable with the second skid steer implements mount; and,
the second skid steer pocket is not engageable with the first skid steer implements mount.

9. A securement frame cooperative with an implement for selectively attaching a first skid steer implements mount and a second skid steer implements mount to the implement, the implement securement frame comprising:
a first skid steer pocket engageable with the first skid steer implements mount;
a second skid steer pocket engageable with the second skid steer implements mount;
wherein the second skid steer pocket is located between the implement and the first skid steer pocket;
a passage opening extending through the first skid steer pocket wherethrough the second skid steer pocket is accessible; and,
wherein, for attaching the implement to the second skid steer implements mount, the second skid steer implements mount is inserted through the passage opening and engages the second skid steer pocket and, for attaching the implement to the first skid steer implements mount, the first skid steer implements mount engages the first skid steer pocket.

10. The implements securement frame of claim 9 wherein:
the first skid steer implements mount comprises a standard skid steer mounting plate;
the second skid steer implements mount comprises a mini skid steer mounting plate;
the mini skid steer mounting plate is smaller than the standard steer skid mounting plate; and,
the mini skid steer mounting plate is insertable through the passage opening and into the second skid steer pocket.

11. The implements securement frame of claim 9 wherein:
the first skid steer pocket extends generally along a first plane;
the second skid steer pocket extends generally along a second plane; and,
the first and second planes are not parallel to one another.

12. The implements securement frame of claim 9 wherein:
the first skid steer pocket extends generally along a first plane;
the second skid steer pocket extends generally along a second plane; and,
the first and second planes are parallel to one another.

13. The implements securement frame of claim 9 wherein:
the first skid steer implements mount comprises an upper end;
the first skid steer pocket comprises a saddle adapted to receive the upper end of the first skid steer mount;
the second skid steer implements mount comprises an upper end;
the second skid steer pocket comprises a saddle adapted to receive the upper end of the second skid steer mount;
the second skid steer mount engages the second skid steer pocket by inserting its upper end into the second skid steer saddle; and,
the first skid steer mount engages the first skid steer pocket by inserting its upper end into the first skid steer saddle.

14. The implements securement frame of claim 9 wherein:
the first skid steer implements mount comprises upper and lower ends;
the first skid steer pocket comprises a saddle adapted to receive the upper end of the first skid steer mount;
the second skid steer implements mount comprises upper and lower ends;
the second skid steer pocket comprises a saddle adapted to receive the upper end of the second skid steer mount;
the second skid steer mount engages the second skid steer pocket by inserting its upper end into the second skid steer saddle and latching its lower end to a lower end of the second skid steer pocket; and,
the first skid steer mount engages the first skid steer pocket by inserting its upper end into the first skid steer saddle and latching its lower end to a lower end of the first skid steer pocket.

15. The implements securement frame of claim 9 wherein:
the first skid steer implements mount comprises a first mounting plate having upper and lower ends;
the first skid steer pocket comprises a saddle adapted to receive the upper end of the first mounting plate;
the second skid steer implements mount comprises a second mounting plate having upper and lower ends;
the second skid steer pocket comprises a saddle adapted to receive the upper end of the second mounting plate;
the second mounting plate is smaller than the first mounting plate;
the second mounting plate is also smaller than the passage opening whereby the second mounting plate is insertable through the passage opening, and the second mounting plate engages the second skid steer pocket by inserting its upper end into the second skid steer saddle and latching its lower end to a lower end of the second skid steer pocket; and,
the first mounting plate engages the first skid steer pocket by inserting its upper end into the first skid steer saddle and latching its lower end to a lower end of the first skid steer pocket.

16. The implements securement frame of claim 9 wherein:
the second skid steer implement mount is smaller than the first skid steer implement mount;
the first skid steer pocket is not engageable with the second skid steer implements mount; and,
the second skid steer pocket is not engageable with the first skid steer implements mount.

17. A method of selectively attaching a first skid steer implements mount and a second skid steer implements mount to an implement, wherein the implement cooperates with a frame comprising:
a first skid steer pocket engageable with the first skid steer implements mount and not engageable with the second skid steer implements mount;
a second skid steer pocket engageable with the second skid steer implements mount and not engageable with the first skid steer implements mount;
wherein the second skid steer pocket is located between the implement and the first skid steer pocket; and,
a passage opening extending through the first skid steer pocket wherethrough the second skid steer pocket is accessible;
wherein the method comprises the steps of:
for attaching the second skid steer implements mount to the implement, inserting the second skid steer implements mount through the passage opening and engaging the second skid steer implements mount with the second skid steer pocket; and, for attaching the first skid steer implements mount to the implement, engaging the first skid steer implements mount with the first skid steer pocket.

18. The method of claim 17 wherein:

the first skid steer implements mount comprises a standard skid steer mounting plate;

the second skid steer implements mount comprises a mini skid steer mounting plate;

the mini skid steer mounting plate is smaller than the standard steer skid mounting plate; and, the mini skid steer mounting plate is also smaller than the passage opening; and, during the step of inserting, the mini skid steer mounting plate is inserted through the passage opening and into the second skid steer pocket.

19. The method of claim 17 wherein:

the first skid steer pocket extends generally along a first plane;

the second skid steer pocket extends generally along a second plane; and, the first and second planes are parallel to one another; and, during the step of engaging the second skid steer implements mount with the second skid steer pocket, the implement is engaged at an angle which is substantially the same relative to during the step of engaging the first skid steer implements mount with the first skid steer pocket.

20. The method of claim 17 wherein:

the first skid steer pocket extends generally along a first plane;

the second skid steer pocket extends generally along a second plane; and, the first and second planes are not parallel to one another; and, during the step of engaging the second skid steer implements mount with the second skid steer pocket, the implement is engaged at an angle which is different relative to during the step of engaging the first skid steer implements mount with the first skid steer pocket.

21. The method of claim 17 wherein:

the first skid steer implements mount comprises an upper end;

the first skid steer pocket comprises a saddle adapted to receive the upper end of the first skid steer mount;

the second skid steer implements mount comprises an upper end;

the second skid steer pocket comprises a saddle adapted to receive the upper end of the second skid steer mount;

during the step of engaging the second skid steer implements mount, the second skid steer mount engages the second skid steer pocket by inserting its upper end into the second skid steer saddle; and, during the step of engaging the first skid steer implements mount, the first skid steer mount engages the first skid steer pocket by inserting its upper end into the first skid steer saddle.

22. The method of claim 17 wherein:

the first skid steer implements mount comprises upper and lower ends;

the first skid steer pocket comprises a saddle adapted to receive the upper end of the first skid steer mount;

the second skid steer implements mount comprises upper and lower ends;

the second skid steer pocket comprises a saddle adapted to receive the upper end of the second skid steer mount;

during the step of engaging the second skid steer implements mount, the second skid steer mount engages the second skid steer pocket by inserting its upper end into the second skid steer saddle and latching its lower end to a lower end of the second skid steer pocket; and, during the step of engaging the first skid steer implements mount, the first skid steer mount engages the first skid steer pocket by inserting its upper end into the first skid steer saddle and latching its lower end to a lower end of the first skid steer pocket.

23. The method of claim 17 wherein:

the first skid steer implements mount comprises a first mounting plate having upper and lower ends;

the first skid steer pocket comprises a saddle adapted to receive the upper end of the first mounting plate;

the second skid steer implements mount comprises a second mounting plate having upper and lower ends;

the second skid steer pocket comprises a saddle adapted to receive the upper end of the second mounting plate;

the second mounting plate is smaller than the first mounting plate;

the second mounting plate is also smaller than the passage opening; and, during the step of inserting, the second mounting plate is inserted through the passage opening and, during the step of engaging the second skid steer implements mount, the second mounting plate engages the second skid steer pocket by inserting its upper end into the second skid steer saddle and latching its lower end to a lower end of the second skid steer pocket; and, during the step of engaging the first skid steer implements mount, the first mounting plate engages the first skid steer pocket by inserting its upper end into the first skid steer saddle and latching its lower end to a lower end of the first skid steer pocket.

* * * * *